(12) United States Patent
Takeuchi

(10) Patent No.: US 11,063,486 B2
(45) Date of Patent: Jul. 13, 2021

(54) CORELESS ELECTRIC MACHINE WITH MAGNET COILS HAVING TRAPEZOIDAL SHAPE AND ANGLE LESS THAN 90 DEGREES WITH CIRCUMFERENTIALLY ALIGNED LEGS

(71) Applicant: Kesatoshi Takeuchi, Nagano (JP)

(72) Inventor: Kesatoshi Takeuchi, Nagano (JP)

(*) Notice: Subject to any disclaimer, the term of this patent is extended or adjusted under 35 U.S.C. 154(b) by 21 days.

(21) Appl. No.: 16/480,747

(22) PCT Filed: Jan. 16, 2018

(86) PCT No.: PCT/JP2018/000902
§ 371 (c)(1),
(2) Date: Jul. 25, 2019

(87) PCT Pub. No.: WO2018/139246
PCT Pub. Date: Aug. 2, 2018

(65) Prior Publication Data
US 2019/0363597 A1 Nov. 28, 2019

(30) Foreign Application Priority Data
Jan. 30, 2017 (JP) .............................. JP2017-014494

(51) Int. Cl.
*H02K 3/04* (2006.01)
*H02K 3/47* (2006.01)
(Continued)

(52) U.S. Cl.
CPC ................. *H02K 3/04* (2013.01); *H02K 3/47* (2013.01); *H02K 5/08* (2013.01); *H02K 15/04* (2013.01); *H02K 21/14* (2013.01); *H02K 23/58* (2013.01)

(58) Field of Classification Search
CPC .. H02K 3/04; H02K 3/47; H02K 5/08; H02K 15/066; H02K 15/04; H02K 21/14; H02K 29/08; H02K 41/03; H02K 2213/03
(Continued)

(56) References Cited

U.S. PATENT DOCUMENTS 4,125,792 A * 11/1978 Schmider ............... H02K 29/08
310/156.34
4,130,769 A * 12/1978 Karube ................... H02K 29/08
310/46

(Continued)

FOREIGN PATENT DOCUMENTS

JP      59201645 A  *  4/1983  ............... H02K 3/04
JP      2549498 Y2     9/1997
(Continued)

*Primary Examiner* — Maged M Almawri
(74) *Attorney, Agent, or Firm* — Global IP Counselors, LLP

(57) ABSTRACT

Each of the magnet coils is configured as a concentrated winding coil with an air core including an upper base part, a lower base part, and two leg parts. The upper base part of one of the magnet coils is housed in the air core region of a different one of the magnet coils which is adjacent to the one magnet coil at the side of the upper base part, and the upper base part and the leg parts of one of the magnet coils are aligned in a circular direction with corresponding ones of the upper base part and the leg parts of another different one of the magnet coils which is adjacent to the one magnet coil at the side of the lower base part, without overlapping corresponding ones of the upper base part and the leg parts of the another different magnet coil in a radial direction.

7 Claims, 23 Drawing Sheets

(51) Int. Cl.
*H02K 5/08* (2006.01)
*H02K 15/04* (2006.01)
*H02K 21/14* (2006.01)
*H02K 23/58* (2006.01)

(58) Field of Classification Search
USPC .... 310/179–208, 216.001, 216.022, 216.003
See application file for complete search history.

(56) References Cited

U.S. PATENT DOCUMENTS

| | | | | |
|---|---|---|---|---|
| 4,331,896 A * | 5/1982 | Sedgewick | ............. | H02K 3/04 29/598 |
| 4,677,332 A * | 6/1987 | Heyraud | ................. | H02K 3/26 310/184 |
| 4,868,443 A * | 9/1989 | Rossi | ..................... | G01P 3/465 310/268 |
| 5,313,131 A * | 5/1994 | Hibino | ..................... | H02K 1/12 310/216.002 |
| 5,744,896 A * | 4/1998 | Kessinger, Jr. | ......... | H02K 3/04 310/198 |
| 5,969,489 A * | 10/1999 | Itou | .................... | G11B 19/2009 318/400.04 |
| 6,140,734 A * | 10/2000 | Hazelton | .................. | H02K 3/04 310/12.21 |
| 6,281,614 B1 * | 8/2001 | Hill | ......................... | H02K 3/12 310/201 |
| 6,570,273 B2 * | 5/2003 | Hazelton | ................ | H02K 41/03 310/12.21 |
| 6,713,924 B1 * | 3/2004 | Fukushima | ............ | H02K 21/24 310/179 |
| 6,822,363 B2 * | 11/2004 | Leijon | ....................... | H01F 3/14 310/196 |
| 6,972,505 B1 * | 12/2005 | Leijon | .................. | H01F 27/288 174/DIG. 20 |
| 7,061,153 B1 * | 6/2006 | Foshage | .................. | H02K 3/47 310/180 |
| 7,619,345 B2 * | 11/2009 | Kalsi | ....................... | H02K 3/47 310/208 |
| 7,893,587 B2 * | 2/2011 | Comte | ..................... | H02K 3/47 310/179 |
| 7,990,013 B2 * | 8/2011 | Seo | .......................... | H02K 3/47 310/216.002 |
| 9,148,047 B2 * | 9/2015 | Hsu | ......................... | H02K 3/04 |
| 9,509,187 B2 * | 11/2016 | Folmli | .................... | H02K 3/00 |
| 9,923,425 B2 * | 3/2018 | Keller | ...................... | H02K 15/04 |
| 10,141,805 B2 * | 11/2018 | Sromin | .................. | H02K 1/2793 |
| 10,778,049 B2 * | 9/2020 | McSheery | ................ | H02K 1/12 |
| 2002/0089237 A1 * | 7/2002 | Hazelton | ................ | H02K 41/03 310/12.25 |
| 2004/0061383 A1 * | 4/2004 | Tsuboi | ................... | H02K 41/03 310/13 |
| 2005/0264123 A1 * | 12/2005 | Maeda | ................. | H02K 15/022 310/180 |
| 2007/0103025 A1 * | 5/2007 | Rohrer | .................... | H02K 3/47 310/179 |
| 2007/0138897 A1 * | 6/2007 | Asaba | ...................... | H02K 3/47 310/208 |
| 2009/0322180 A1 * | 12/2009 | Nonaka | ................ | H02K 15/028 310/215 |
| 2010/0001610 A1 * | 1/2010 | Iki | ...................... | H02K 15/0407 310/208 |
| 2011/0273052 A1 * | 11/2011 | Long | ...................... | H02K 16/02 310/208 |
| 2013/0249344 A1 * | 9/2013 | Folmli | .................... | H02K 3/00 310/184 |
| 2014/0232246 A1 * | 8/2014 | Sugiura | ............... | F04D 25/0613 310/68 R |
| 2015/0015124 A1 * | 1/2015 | Rajasingham | ......... | H02K 21/24 310/60 A |
| 2015/0381003 A1 * | 12/2015 | Rajasingham | ........... | H02K 3/18 310/68 R |
| 2019/0296596 A1 * | 9/2019 | Iwaya | ..................... | H02K 3/04 |

FOREIGN PATENT DOCUMENTS

| | | |
|---|---|---|
| JP | 2001-275298 A | 10/2001 |
| JP | 2003-070197 A | 3/2003 |
| JP | 2007-124892 A | 5/2007 |
| JP | 2010-141975 A | 6/2010 |
| JP | 2013-198398 A | 9/2013 |

* cited by examiner

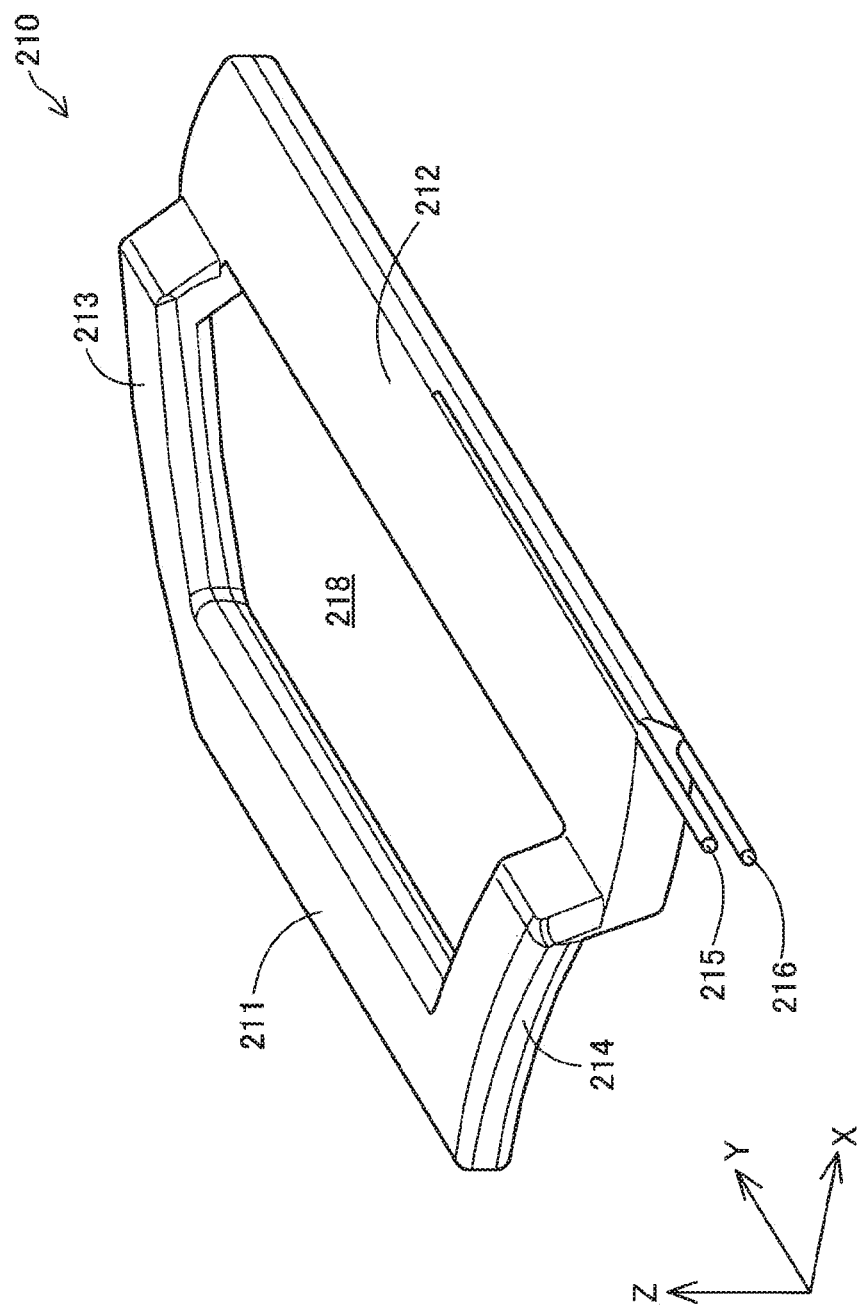

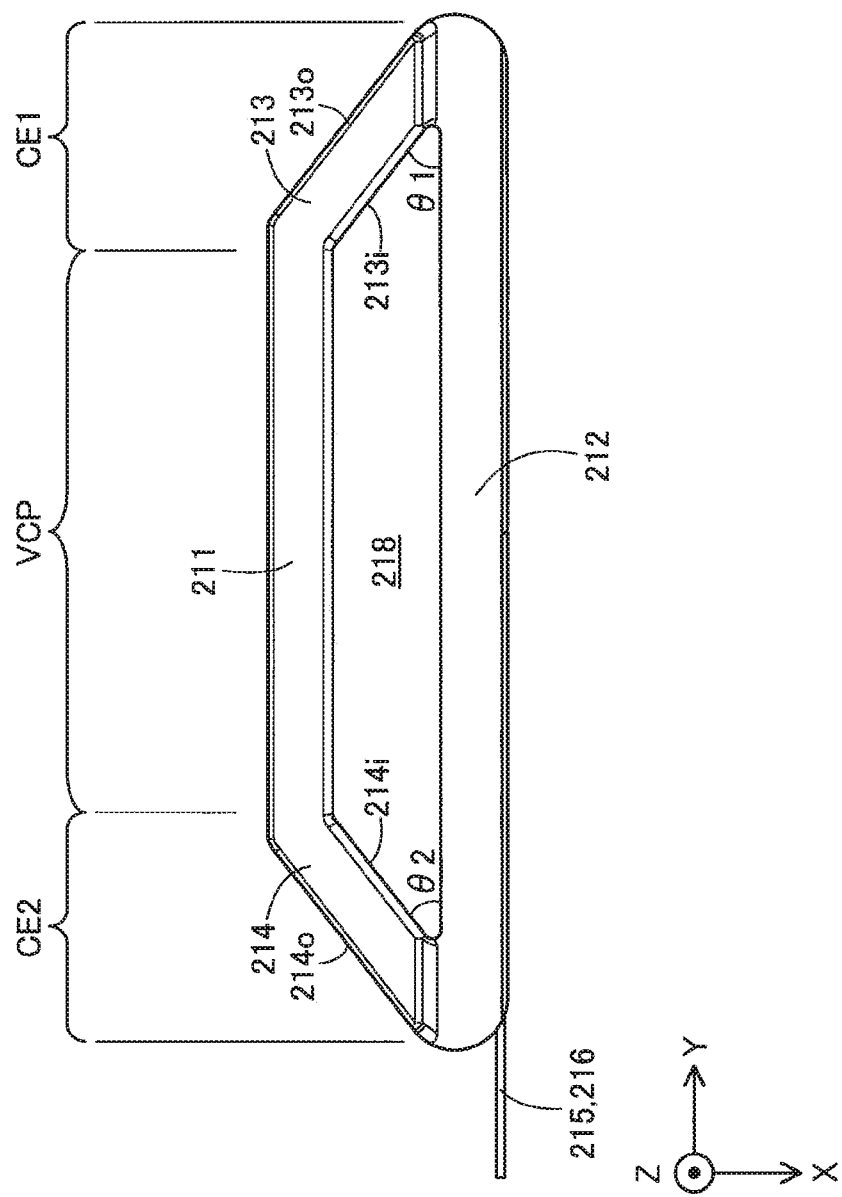

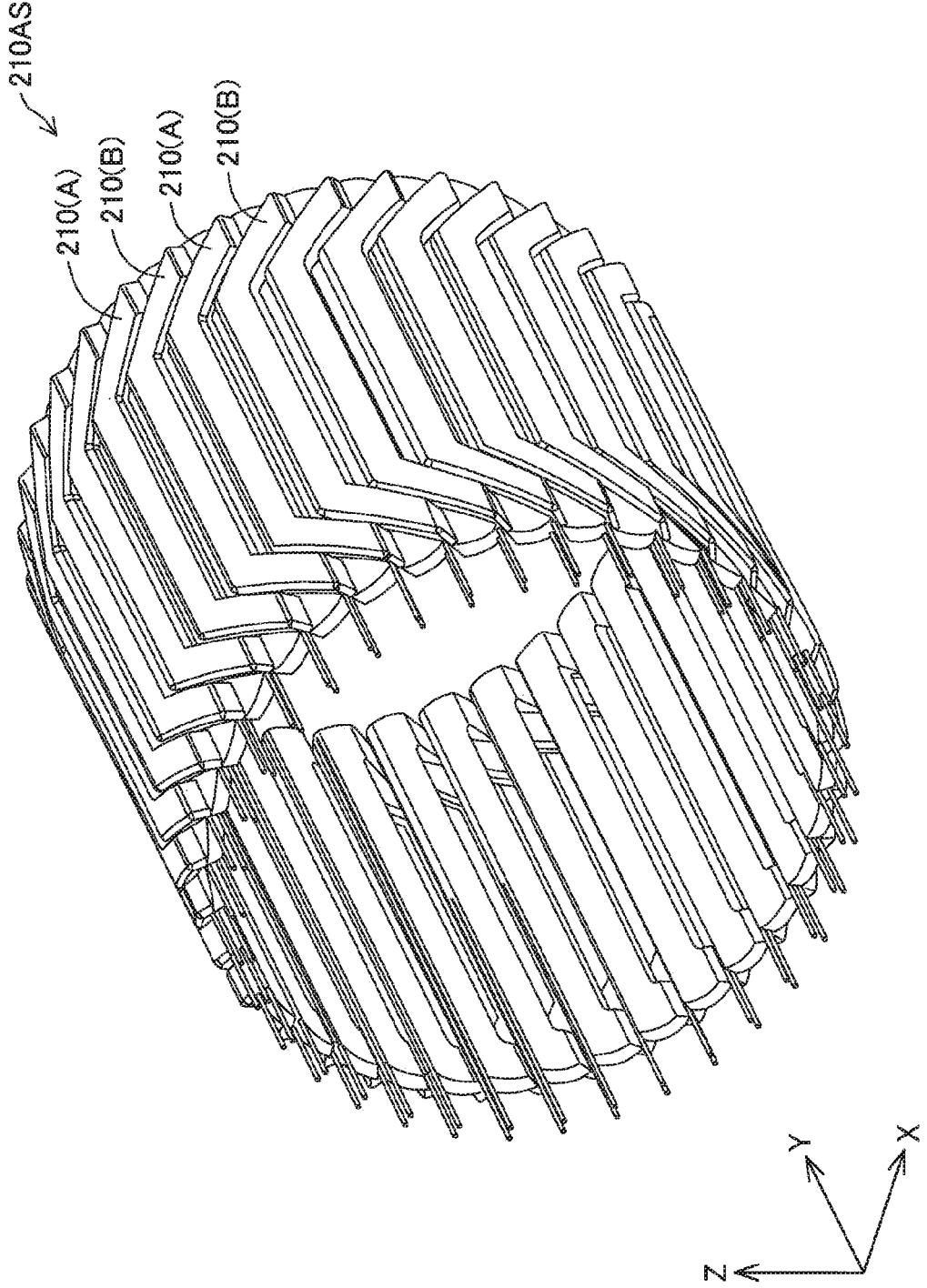

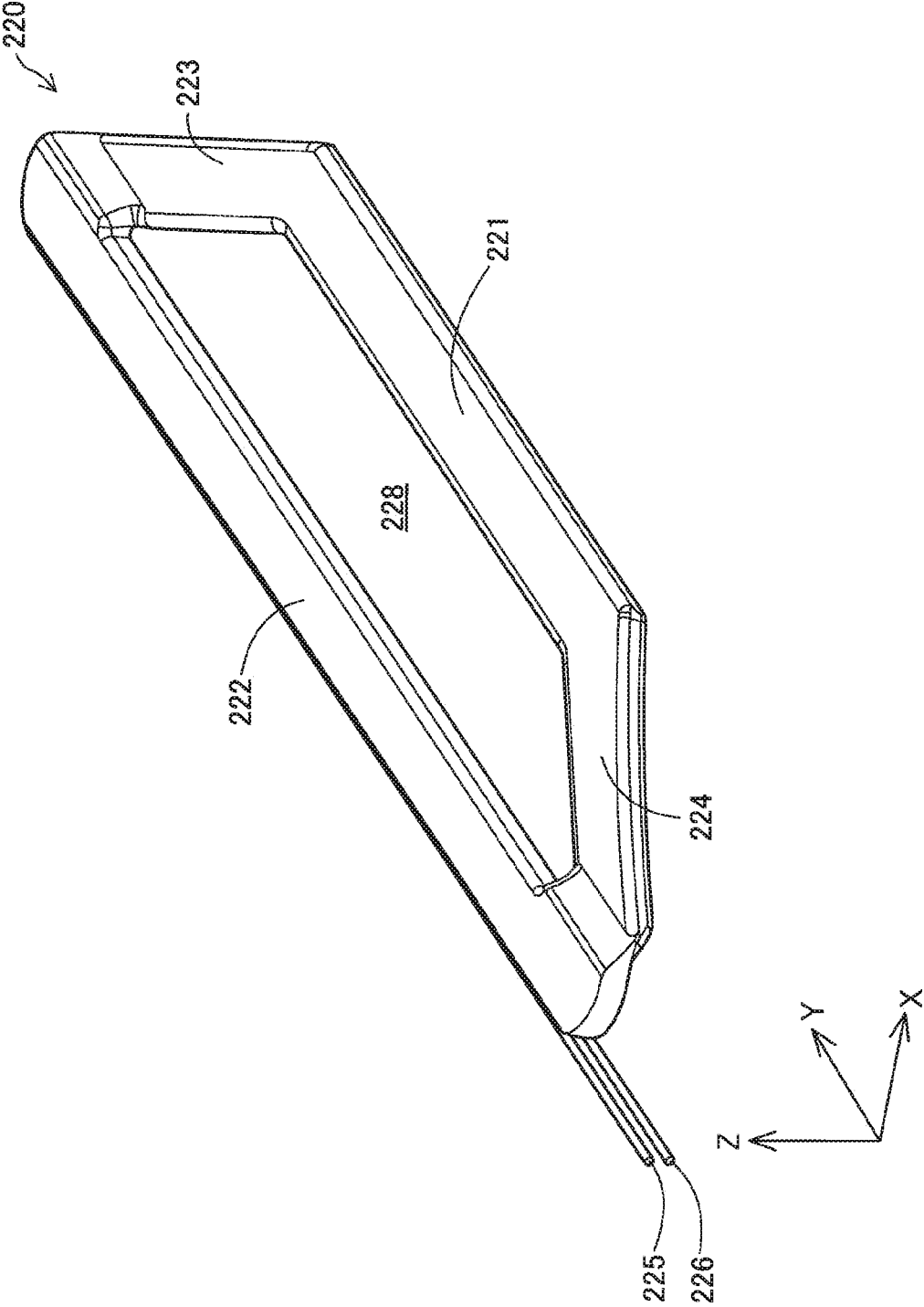

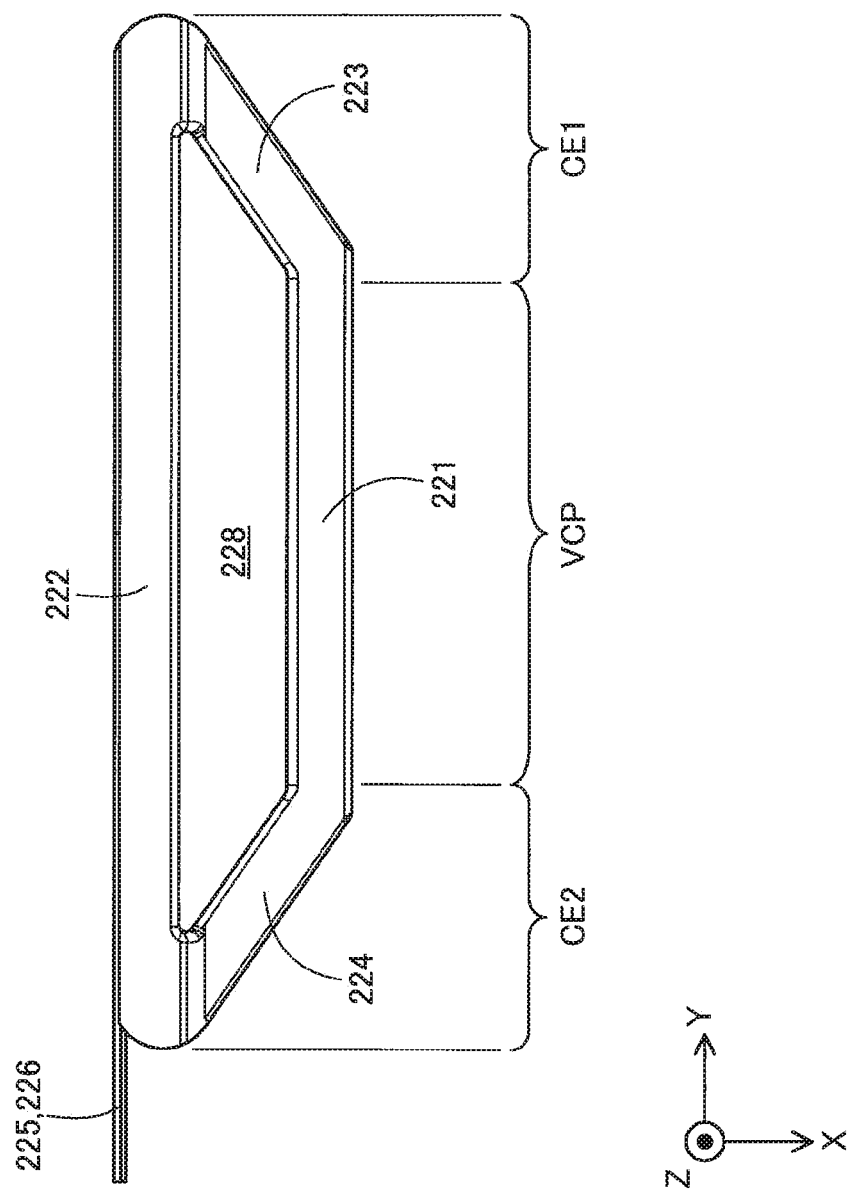

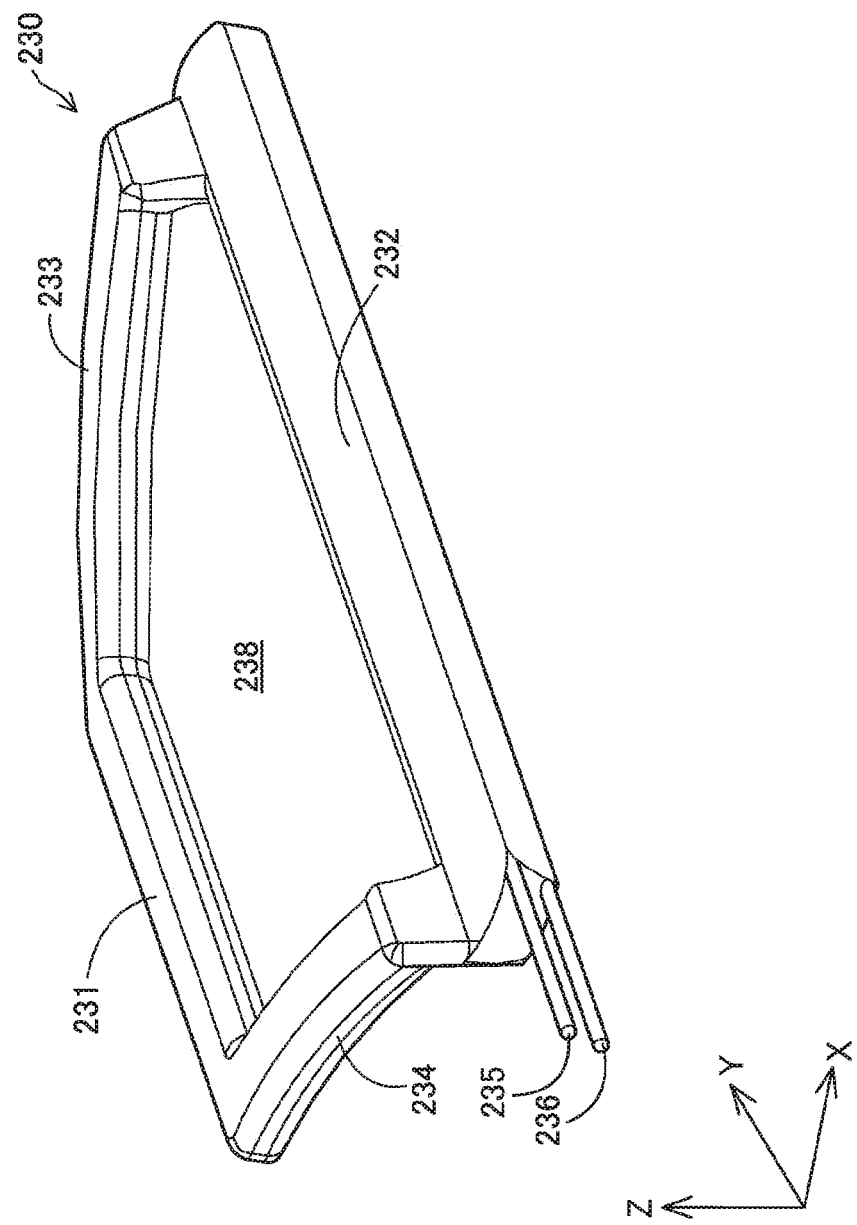

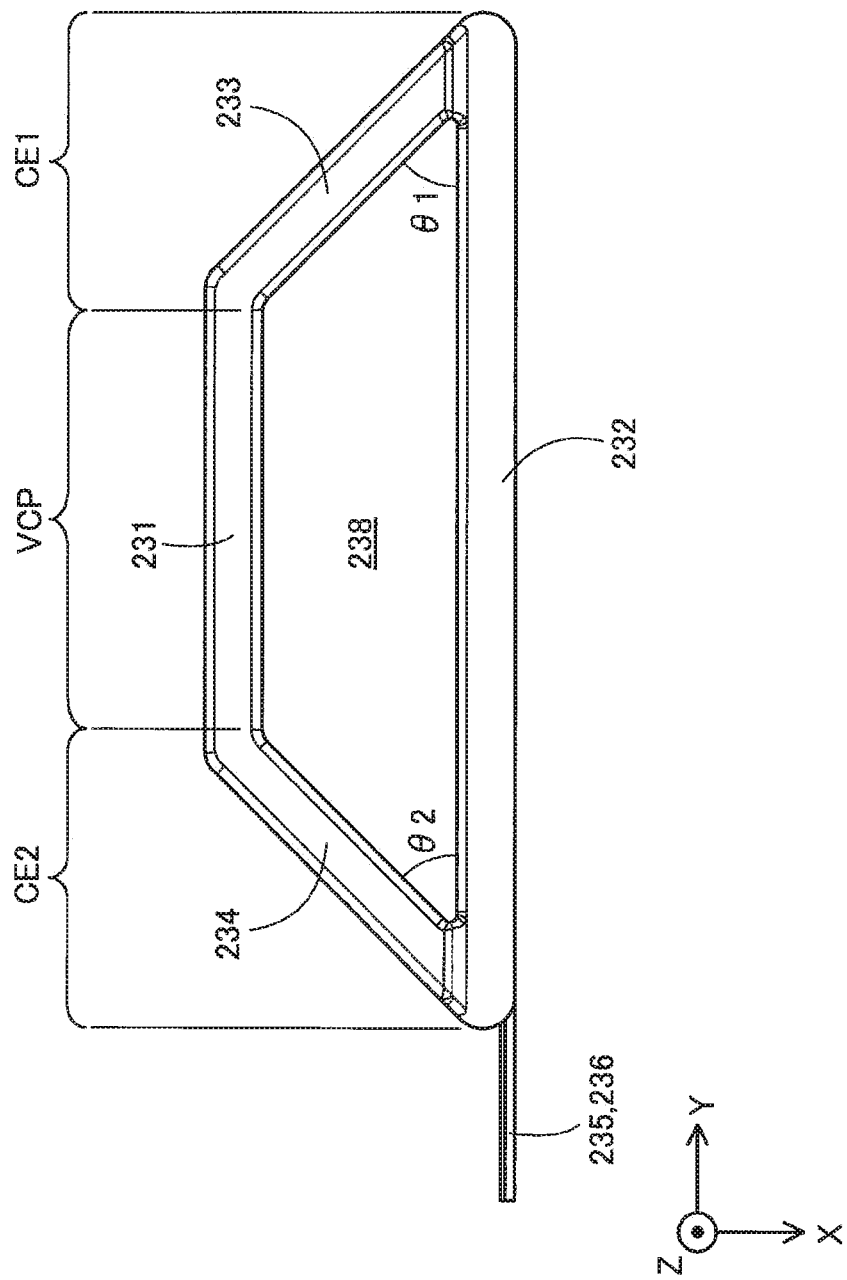

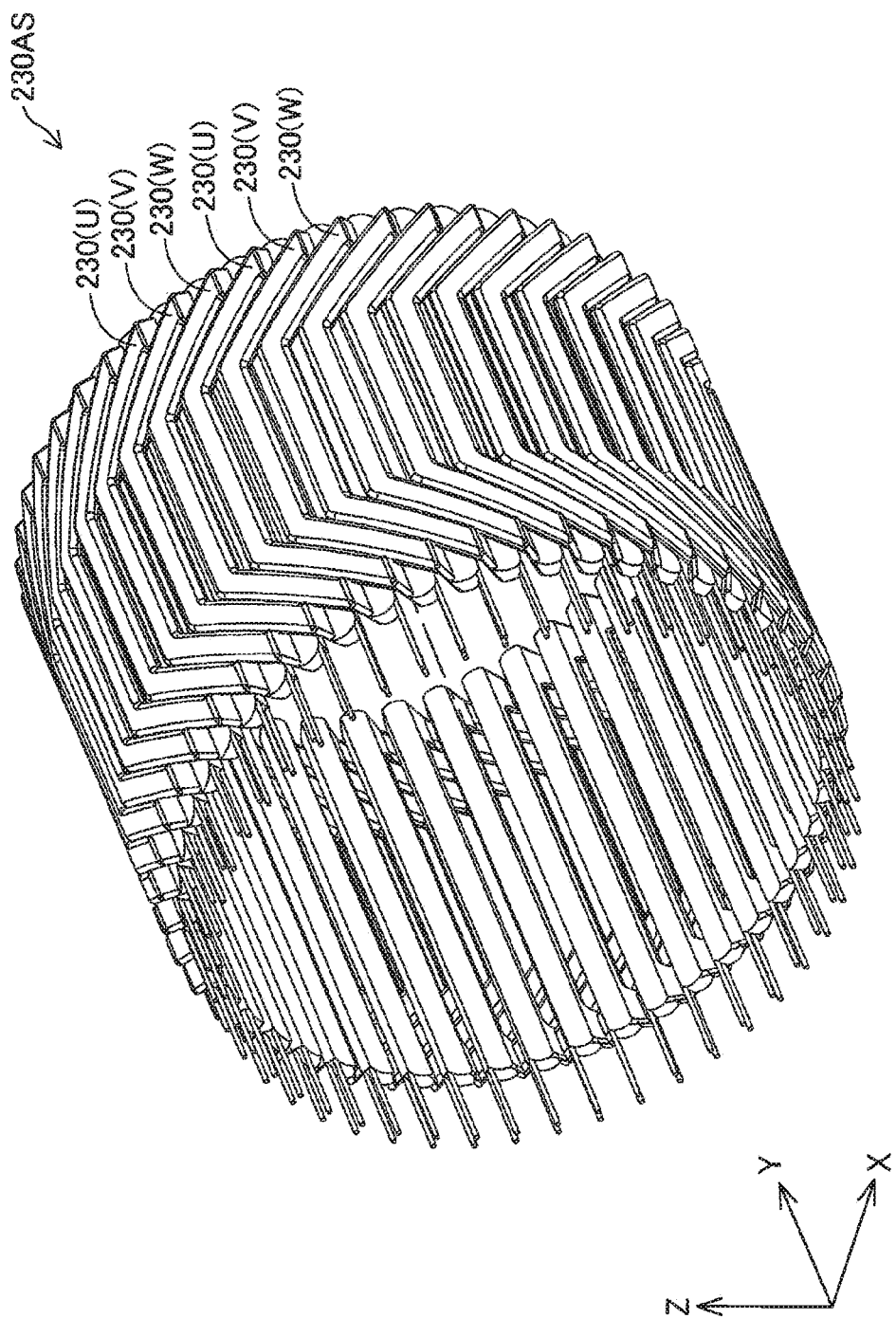

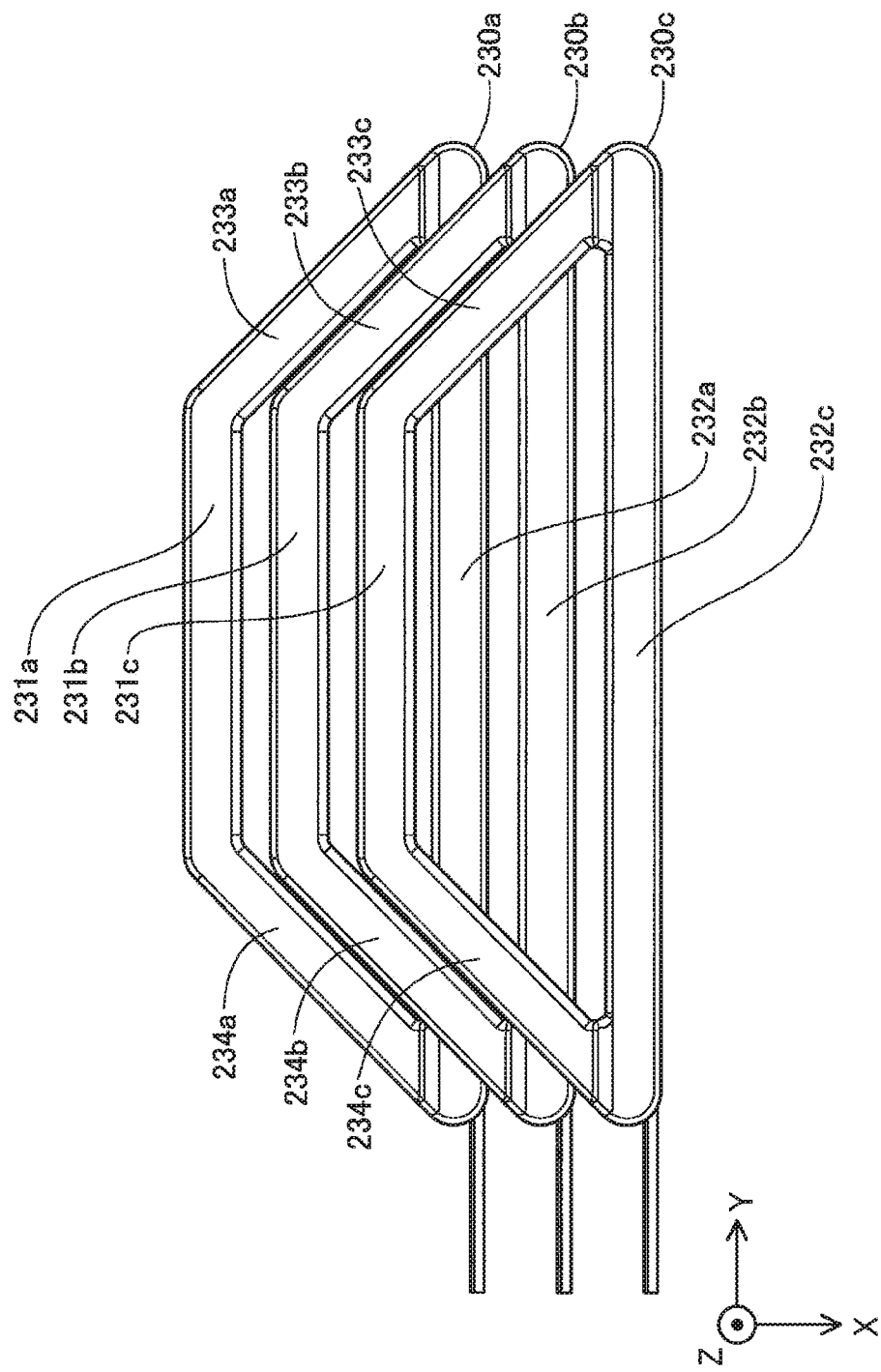

CORELESS ELECTRIC MACHINE WITH MAGNET COILS HAVING TRAPEZOIDAL SHAPE AND ANGLE LESS THAN 90 DEGREES WITH CIRCUMFERENTIALLY ALIGNED LEGS

CROSS REFERENCE TO RELATED APPLICATIONS

The present application claims priority from Japanese application No. JP2017-014494 filed on Jan. 30, 2017, and the disclosure of which is hereby incorporated in its entirety by reference into the present application.

BACKGROUND

Field

The present invention relates to a coreless electric machine such as an electric motor or a generator.

Related Art

JP2010-141975A discloses a motor which uses a group of concentrated winding coils with air cores. Each of the coils of the motor partially overlaps an adjacent one of the coils, and these coils are arranged so as to be spaced by an equal distance from a permanent magnet. In this motor, the equal distance from the coils to the permanent magnet achieves reduction in torque ripple to be caused in the motor.

According to the foregoing background technique, however, efforts have not been made sufficiently for a specific shape of a coil, making it difficult to achieve a coreless electric machine with little torque ripple.

SUMMARY

The present invention has been made to solve at least one of the foregoing problems, and is feasible in the following aspects.

(1) A first aspect of the present invention is a two-phase coreless electric machine comprising: a rotor including a permanent magnet and rotating about a center axis; and a stator including a coil assembly with a combination of multiple magnet coils and arranged concentrically with the rotor via a gap from the rotor. Each of the magnet coils is configured as a concentrated winding coil comprising an upper base part parallel to the center axis, a lower base part facing the upper base part, two leg parts connecting the upper base part and the lower base part, and an air core region surrounded by the upper base part, the lower base part, and the two leg parts. The two leg parts are formed so as to set an angle of less than 90 degrees between the lower base part and each of the leg parts. The upper base part and the lower base part are arranged on two circumferences respectively at different distances from the center axis and each of the two leg parts has a level difference portion for connecting the upper base part and the lower base part. The coil assembly has a structure in which (i) the coil assembly is formed by arranging the magnet coils at regular intervals in a circular direction about the center axis; (ii) the magnet coils are connected in such a manner that any two of the magnet coils adjacent to each other in the circular direction belong to different phases; (iii) the upper base part of each one of the magnet coils is housed in the air core region of a different one of the magnet coils which is adjacent the each one magnet coil at a side of the upper base part side; and (iv) the upper base part and the two leg parts of the each one of the magnet coils are aligned in the circular direction with corresponding ones of the upper base part and the two leg parts of another different one of the magnet coils which is adjacent to the each one magnet coil at a side of the lower base part side, without overlapping corresponding ones of the upper base part and the two leg parts of the another different magnet coil in a radial direction of the stator.

According to the coreless electric machine of the foregoing first aspect, the magnet coil and the coil assembly have the foregoing features (i) to (iv). Thus, a two-phase coreless electric machine with little torque ripple is achieved by the use of this coil assembly.

(2) A second aspect of the present invention is a three-phase coreless electric machine comprising: a rotor including a permanent magnet and rotating about a center axis; and a stator including a coil assembly with a combination of multiple magnet coils and arranged concentrically with the rotor via a gap from the rotor. Each of the magnet coils is configured as a concentrated winding coil comprising an upper base part parallel to the center axis, a lower base part facing the upper base part, two leg parts connecting the upper base part and the lower base part, and an air core region surrounded by the upper base part, the lower base part, and the two leg parts. The two leg parts are formed so as to set an angle of less than 90 degrees between the lower base part and each of the leg parts. The upper base part and the lower base part are arranged on two circumferences respectively at different distances from the center axis and each of the two leg parts has a level difference portion for connecting the upper base part and the lower base part. The coil assembly has a structure in which (i) the coil assembly is formed by arranging the magnet coils at regular intervals in a circular direction about the center axis; (ii) the magnet coils are connected in such a manner that any three of the magnet coils adjacent to each other in the circular direction belong to different phases; (iii) the respective upper base parts of any two of the magnet coils adjacent to each other in the circular direction are housed in the air core region of a different one of the magnet coils which is adjacent to the two magnet coils at a side of the upper base part; and (iv) the upper base part and the two leg parts of the each one of the magnet coils are aligned in the circular direction with corresponding ones of the upper base part and the two leg parts of another different one of the magnet coils which is adjacent to the each one magnet coil at a side of the lower base part, without overlapping corresponding ones of the upper base part and the two leg parts of the another different magnet coil in a radial direction of the stator.

According to the coreless electric machine of the foregoing second aspect, the magnet coil and the coil assembly have the foregoing features (i) to (iv). Thus, a three-phase coreless electric machine with little torque ripple is achieved by the use of this coil assembly.

(3) In the coreless electric machine of each of the above aspects, the two leg parts of the each one of the magnet coils may contact, in the circular direction, the two leg parts of the another different one of the magnet coils which is adjacent to the each one magnet coil at the side of the lower base part.

This coreless electric machine allows increase in a coil wire density.

(4) In the coreless electric machine of each of the above aspects, each of the magnet coils may have a trapezoidal shape in a plan view.

This coreless electric machine allows the magnet coils to be arranged densely to allows further increase in a coil wire density.

(5) In the coreless electric machine of each of the above aspects, each of the magnet coils may have two coil ends, and the two coil ends may be taken out from a coil end part of the lower base part.

This coreless electric machine achieves a configuration facilitating power feeding of each magnet coil.

(6) A third aspect of the present invention is a coil assembly with multiple magnet coils combined in a ring-like pattern. Each of the magnet coils comprises an upper base part parallel to a center axis of the ring-like shape, a lower base part facing the upper base part, and two leg parts connecting the upper base part and the lower base part. The upper base part and the lower base part are arranged on a first circumference and a second circumference respectively in the coil assembly. At opposite ends of the upper base part, the upper base part is connected to the leg parts at positions on the first circumference. At opposite ends of the lower base part, the lower base part is connected to the leg parts at positions on the second circumference.

This coil assembly achieves a coreless electric machine with little torque ripple.

(7) A fourth aspect of the present invention is a magnet coil comprising a linear upper base part, a lower base part parallel to and facing the upper base part and longer than the upper base part, two leg parts connecting the upper base part and the lower base part, and an air core region surrounded by the upper base part, the lower base part, and the two leg parts. The two leg parts are formed so as to set an angle of less than 90 degrees between the lower base part and each of the leg parts. At opposite ends of the upper base part, the upper base part is connected to the leg parts at positions out of a plane including the lower base part. At opposite ends of the lower base part, the lower base part is connected to the leg parts at positions within the plane.

This magnet coil achieves a coreless electric machine with little torque ripple.

(8) A fifth aspect of the present invention is a two-phase coreless electric machine comprising: a slider including a permanent magnet and moving along a predetermined movement axis; and a stator including a coil assembly with multiple magnet coils combined along the movement axis. Each of the magnet coils is configured as a concentrated winding coil comprising an upper base part perpendicular to the movement axis, a lower base part parallel to and facing the upper base part and at the same distance from the movement axis as the upper base part, two leg parts connecting the upper base part and the lower base part, and an air core region surrounded by the upper base part, the lower base part, and the two leg parts. Each of the two leg parts has a level difference portion formed at a position connected to the upper base part or the lower base part. The coil assembly has a structure in which (i) the coil assembly is formed by arranging the magnet coils at regular intervals in a direction of the movement axis; (ii) the magnet coils are connected in such a manner that any two of the magnet coils adjacent to each other in the direction of the movement axis belong to different phases; (iii) the upper base part of each one of the magnet coils is housed in the air core region of a different one of the magnet coils which is adjacent to the each one magnet coil at a side of the upper base part; and (iv) the upper base part and the two leg parts of the each one of the magnet coils are aligned in the direction of the movement axis with corresponding ones of the upper base part and the two leg parts of another different one of the magnet coils which is adjacent to the each one magnet coil at a side of the lower base part, without overlapping corresponding ones of the upper base part and the two leg parts of the another different magnet coil in a direction perpendicular to the movement axis.

According to the coreless electric machine of the foregoing fifth aspect, the magnet coil and the coil assembly have the foregoing features (i) to (iv). Thus, a two-phase coreless electric machine with little torque ripple is achieved by the use of this coil assembly.

(9) A sixth aspect of the present invention is a three-phase coreless electric machine comprising: a slider including a permanent magnet and moving along a predetermined movement axis; and a stator including a coil assembly with multiple magnet coils combined along the movement axis. Each of the magnet coils is configured as a concentrated winding coil comprising an upper base part perpendicular to the movement axis, a lower base part parallel to and facing the upper base part and at the same distance from the movement axis as the upper base part, two leg parts connecting the upper base part and the lower base part, and an air core region surrounded by the upper base part, the lower base part, and the two leg parts. Each of the two leg parts has a level difference portion formed at a position connected to the upper base part or the lower base part. The coil assembly has a structure in which (i) the coil assembly is formed by arranging the magnet coils at regular intervals in a direction of the movement axis; (ii) the magnet coils are connected in such a manner that any three of the magnet coils adjacent to each other in the direction of the movement axis belong to different phases; (iii) the upper base part of the each one of the magnet coils is housed in the air core region of a different one of the magnet coils which is adjacent to the each one magnet coil at a side of the upper base part; and (iv) the upper base part and the two leg parts of the each one of the magnet coils are aligned in the direction of the movement axis with corresponding ones of the upper base part and the two leg parts of another different one of the magnet coils which is adjacent to the each one magnet coil at a side of the lower base part, without overlapping corresponding ones of the upper base part and the two leg parts of the another different magnet coil in a direction perpendicular to the movement axis.

According to the coreless electric machine of the foregoing sixth aspect, the magnet coil and the coil assembly have the foregoing features (i) to (iv). Thus, a three-phase coreless electric machine with little torque ripple is achieved by the use of this coil assembly.

BRIEF DESCRIPTION OF THE DRAWINGS

FIG. 2A is a perspective view of a magnet coil according to the first embodiment;

FIG. 2C is a plan view of the magnet coil according to the first embodiment;

FIG. 3 is a perspective view of a coil assembly according to the first embodiment;

FIG. 8A is a perspective view of a magnet coil according to a second embodiment;

FIG. 8C is a plan view of the magnet coil according to the second embodiment;

FIG. 10A is a perspective view of a magnet coil according to a third embodiment;

FIG. 10C is a plan view of the magnet coil according to the third embodiment;

FIG. 11 is a perspective view of a coil assembly according to the third embodiment;

FIG. 12 is an explanatory view showing multiple magnet coils in a state of being superimposed on each other;

DETAILED DESCRIPTION

A. First Embodiment

Figure 1:
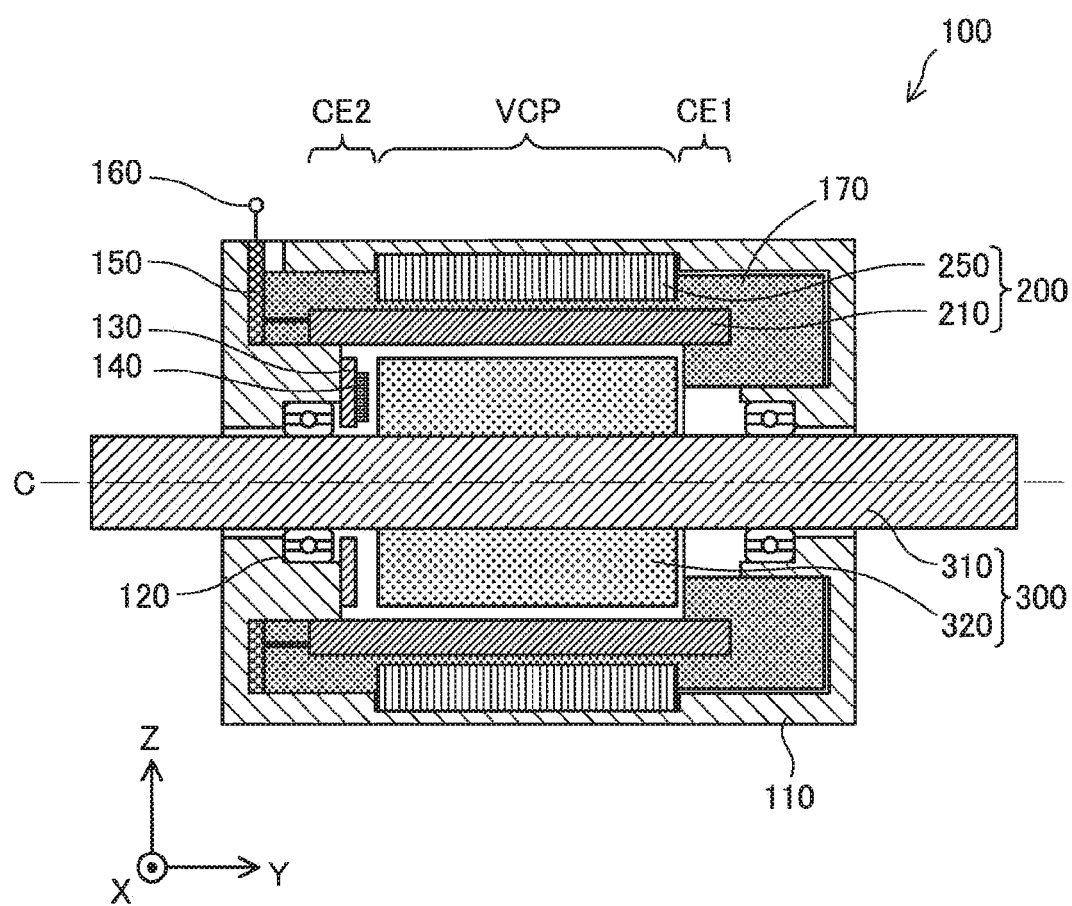
FIG. 1 is a sectional view of a coreless motor according to a first embodiment.

FIG. 1 is a sectional view of a careless motor 100 as a careless electric machine according to a first embodiment. The coreless motor 100 is an inner rotor type motor having a radial gap structure including a casing 110, a stator 200, and a rotor 300. FIG. 1 shows an X direction, a Y direction, and a Z direction orthogonal to each other. The Y direction is a direction parallel to a center axis C of the rotor 300. Where necessary, the X, Y, and Z directions in FIG. 1 are also illustrated in FIG. 2 and subsequent drawings.

The rotor 300 includes a rotor shaft 310 that rotates about the center axis C, and a permanent magnet 320 provided external to the rotor shaft 310. While only one permanent magnet 320 may be provided, two or more permanent magnets 320 are generally provided. Each permanent magnet 320 is magnetized in a radial direction corresponding to an outward direction from the center axis C of the rotor 300. A direction of the magnetization of the permanent magnet 320 is not limited to the radial direction (or radiation direction from the center) but the permanent magnet 320 may be magnetized in a different direction like in parallel magnetization. The "radial direction of the rotor 300" means a direction perpendicular to the center axis C of the rotor 300 and extending outwardly in a radial pattern from the center axis C. The opposite end portions of the rotor shaft 310 are supported by bearings 120 provided at the casing 110.

The stator 200 is housed in the casing 110 and arranged external to the rotor 300 in the radial direction via a gap therebetween. The stator 200 includes a coil back yoke 250 provided inside the casing 110, and multiple magnet coils 210 provided inside the coil back yoke 250. The coil back yoke 250 is made of a magnetic material and has a substantially cylindrical shape. The magnet coils 210 are molded with resin 170 having excellent heat conductivity, insulating properties, and rigidity. Coil conductive wires of the magnet coils 210 are each connected to a connecting substrate 150. A coil terminal 160 for power feeding is taken out of the connecting substrate 150 to the outside of the casing 110.

The magnet coils 210 each include an effective coil part VCP, and a first coil end part CE1 and a second coil end part CE2 provided on opposite sides of the effective coil part VCP. The effective coil part VCP is a coil part for making energy conversion between electrical energy and mechanical energy effectively. The coil end parts CE1 and CE2 are coil parts not directly involved in the energy conversion. In the presence of the coil back yoke 250, a coil part overlapping the coil back yoke 250 in the radial direction corresponds to the effective coil part VCP, and a coil part not overlapping the coil back yoke 250 in the radial direction corresponds to the coil end parts CE1 and CE2. The shape of the magnet coil 210 will be described further later.

The casing 110 includes a magnetic sensor 140 as a position sensor for detecting the rotary position of the rotor 300. The magnetic sensor 140 is connected to a circuit board 130. In this embodiment, the magnetic sensor 140 and the circuit board 130 are arranged on one of the opposite sides of the permanent magnet 320 and on the same side as the second coil end part CE2.

Figure 2B:
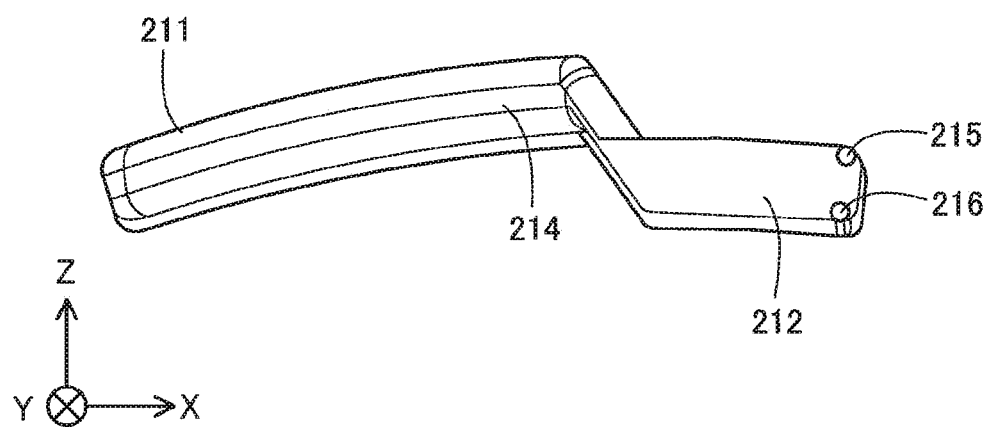
FIG. 2B is a front view of the magnet coil according to the first embodiment.

FIGS. 2A, 2B, and 2C are a perspective view, a front view, and a side view respectively of the magnet coil 210. FIG. 3 is a perspective view of a coil assembly 210AS with the magnet coils 210 shown in FIGS. 2A to 2C combined in a cylindrical shape or an annular shape. In FIG. 3, characters "(A)" and "(B)" added after the signs 210 of magnet coils show a difference between an A phase and a B phase. Namely, the coreless motor 100 of the first embodiment is configured as a two-phase motor.

In the plan view of FIG. 2C, the magnet coil 210 is configured as a concentrated winding coil having a trapezoidal shape with an upper base part 211 parallel to the center axis C of the rotor 300 (FIG. 1), a lower base part 212 facing the upper base part 211, and two leg parts 213 and 214 connecting the upper base part 211 and the lower base part 212. Each of the upper base part 211, the lower base part 212, and the two leg parts 213 and 214 has a linear shape. The upper base part 211 is shorter than the lower base part 212. As shown in FIG. 2C, the upper base part 211 and the lower base part 212 are two parallel coil parts each extending in a direction (Y direction) parallel to the center axis C of the rotor 300 and each including a portion corresponding to the effective coil part VCP in FIG. 1. Space surrounded by the upper base part 211, the lower base part 212, and the two leg parts 213 and 214 is called an "air core region 218." The two leg parts 213 and 214 are formed so as to set an angle θ1 between the lower base part 212 and the leg part 213 and an angle θ2 between the lower base part 212 and the leg part 214 to be less than 90 degrees. In this example, the two angles θ1 and θ2 are set to be equal degrees and the magnet coil 210 has an isosceles trapezoidal shape in a plan view. However, the two angles θ1 and θ2 may be set to be different degrees. The "plan view" means a state of the magnet coil 210 observed when the magnet coil 210 is placed on a plane and viewed in a direction perpendicular to this plane. While the magnet coil 210 is observed in the plan view, the upper base part 211 and the lower base part 212 are parallel to each other, and the leg parts 213 and 214 extend from the upper base part 211 and the lower base part 212 in obliquely tilted directions. In this description, the "trapezoidal shape" includes not only a trapezoid in a strict sense, but a shape in which a connection between an upper base or a lower base and a leg part is bent at a curvature or flexed such as that shown in FIG. 2C is also called a "trapezoid" or a "trapezoidal shape." Forming each magnet coil 210 into a trapezoidal shape in the plan view allows the magnet coils 210 to be arranged densely, making it possible to increase a coil wire density.

As understood from FIG. 3, the upper base part 211 and the lower base part 212 of the magnet coil 210 are arranged on two circumferences at different distances from the center axis C of the rotor 300. More specifically, the upper base part 211 is at a greater distance from the center axis C of the rotor 300 than the lower base part 212. As shown in FIGS. 2A and 2B, the two leg parts 213 and 214 each have a level difference portion for connecting the upper base part 211 and the lower base part 212. More specifically, the leg parts 213 and 214 each have a bent shape like a Z so as to connect the upper base part 211 and the lower base part 212. At opposite ends of the upper base part 211, the upper base part 211 is connected to the leg parts 213 and 214 at positions on the first circumference where the upper base part 211 exists. At opposite ends of the lower base part 212, the lower base part 212 is connected to the leg parts 213 and 214 at positions on the second circumference where the lower base part 212 exists. The first circumference is arranged external to the second circumference (a position at a greater distance from the center axis of the coil assembly). The level difference portions of the leg parts 213 and 214 are connections between the first circumference and the second circumference at positions closer to the lower base part 212 than to the upper base part 211. As shown in FIG. 2C, the first leg part 213 has an outer side surface 213o and an inner side surface 213i. In a plan view, the width of the leg part 213 is constant and the outer side surface 213o and the inner side surface 213i of the leg part 213 are parallel to each other. Likewise, the second leg part 214 has an outer side surface 214o and an inner side surface 214i. The width of the leg part 214 is constant and the outer side surface 214o and the inner side surface 214i of the leg part 214 are parallel to each other. The magnet coil 210 has two coil ends 215 and 216 taken out from the lower base part 212 belonging to the second coil end part CE2 (FIG. 1). This makes it possible to form a configuration facilitating power feeding of each magnet coil 210.

As shown in FIG. 3, the coil assembly 210AS may be formed by locating the magnet coils 210 in a ring-like pattern at regular intervals in a circular direction about the center axis C of the rotor 300, and bonding the magnet coils 210 to each other. At this time, a coil wire density may be increased by locating the magnet coils 210 in such a manner that the respective first leg parts 213 of adjacent ones of the magnet coils 210 contact each other in the circular direction and the respective second leg parts 214 of the adjacent magnet coils 210 contact each other in the circular direction. In this case, the magnet coil 210 preferably has an isosceles trapezoidal shape in a plan view. This achieves arrangement of the magnet coils 210 in which all the magnet coils 210 are aligned neatly in the circular direction about the center axis C of the rotor 300. This makes it possible to increase a coil wire density sufficiently without causing increase in the size of the coreless motor 100 in an axis direction. In the first embodiment, the magnet coils 210 are connected in such a manner that any two of the magnet coils 210 adjacent to each other in the circular direction belong to different phases (A phase or B phase).

As understood from FIG. 3, the magnet coils 210 are arranged while the respective leg parts 213 contact each other with substantially no clearance therebetween and the respective leg parts 214 contact each other with substantially no clearance therebetween. This makes it possible to increase a coil wire density of the coil assembly 210AS sufficiently. As described above, the upper base part 211 and the lower base part 212 of each of the magnet coils 210 are arranged on two circumferences at different distances from the center axis C of the rotor 300. Employing these characteristic shapes and arrangement ensures to maintain a constant distance from the permanent magnet 320 (FIG. 1) to each magnet coil 210. More specifically, a distance from the permanent magnet 320 to each of the A-phase magnet coil 210(A) and the B-phase magnet coil 210(B) is always maintained constant. This makes it possible to realize the coreless motor 100 with little torque ripple.

In this description, "torque ripple" has meaning including both fluctuations in driving torque to occur when the coreless motor 100 is used as a motor, and fluctuations in braking torque to occur when the coreless motor 100 is used as a generator.

Figure 4A:
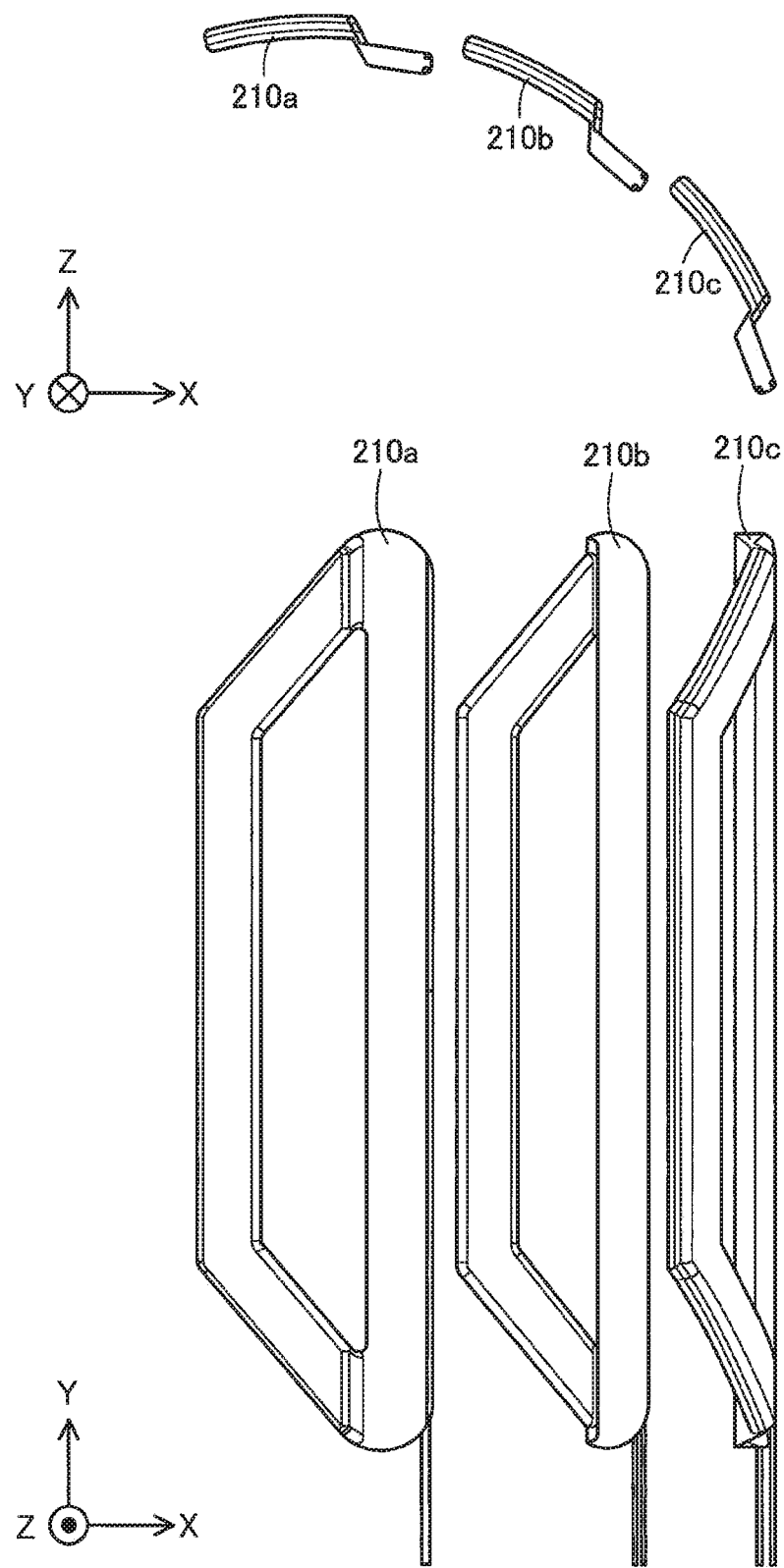
FIG. 4A is an explanatory view showing how multiple magnet coils are superimposed on each other.
Figure 4B:
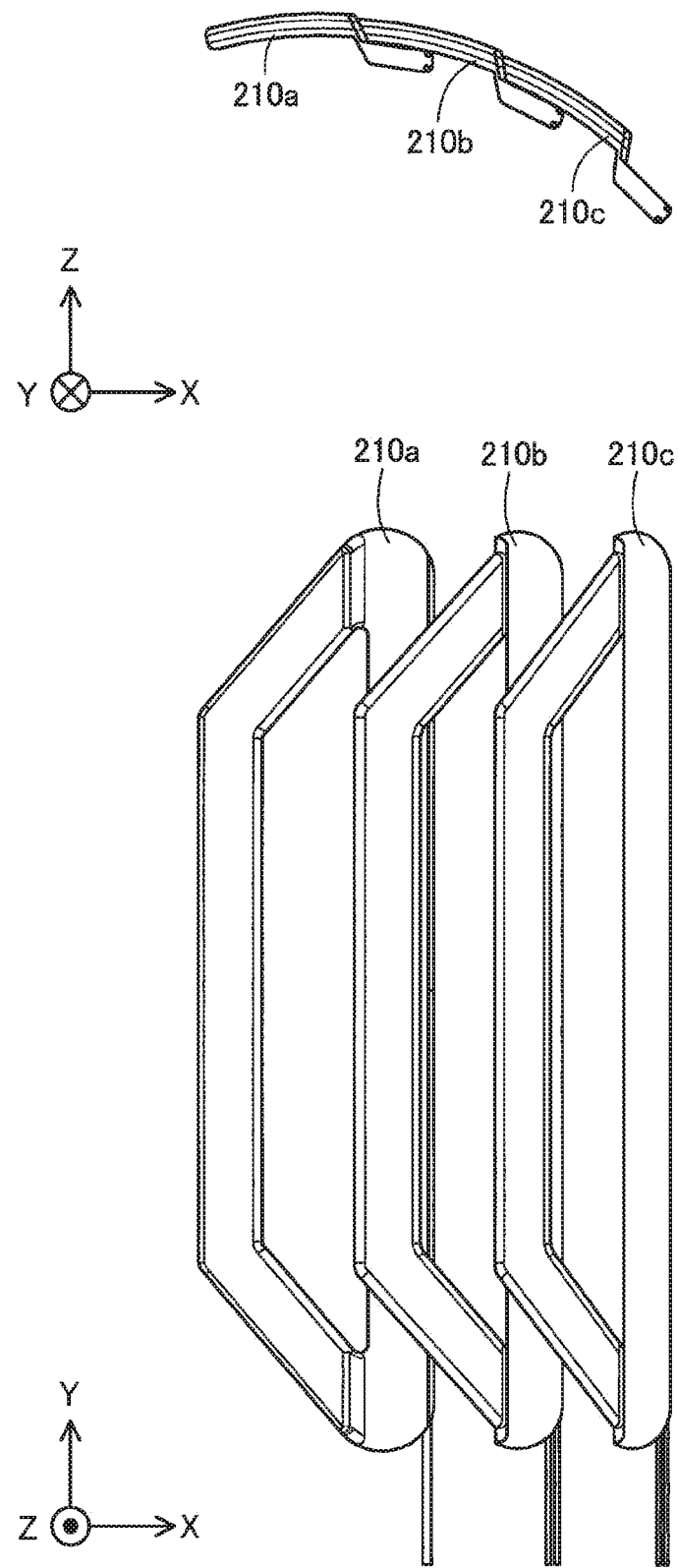
FIG. 4B is an explanatory view showing how the magnet coils are superimposed on each other.
Figure 4C:
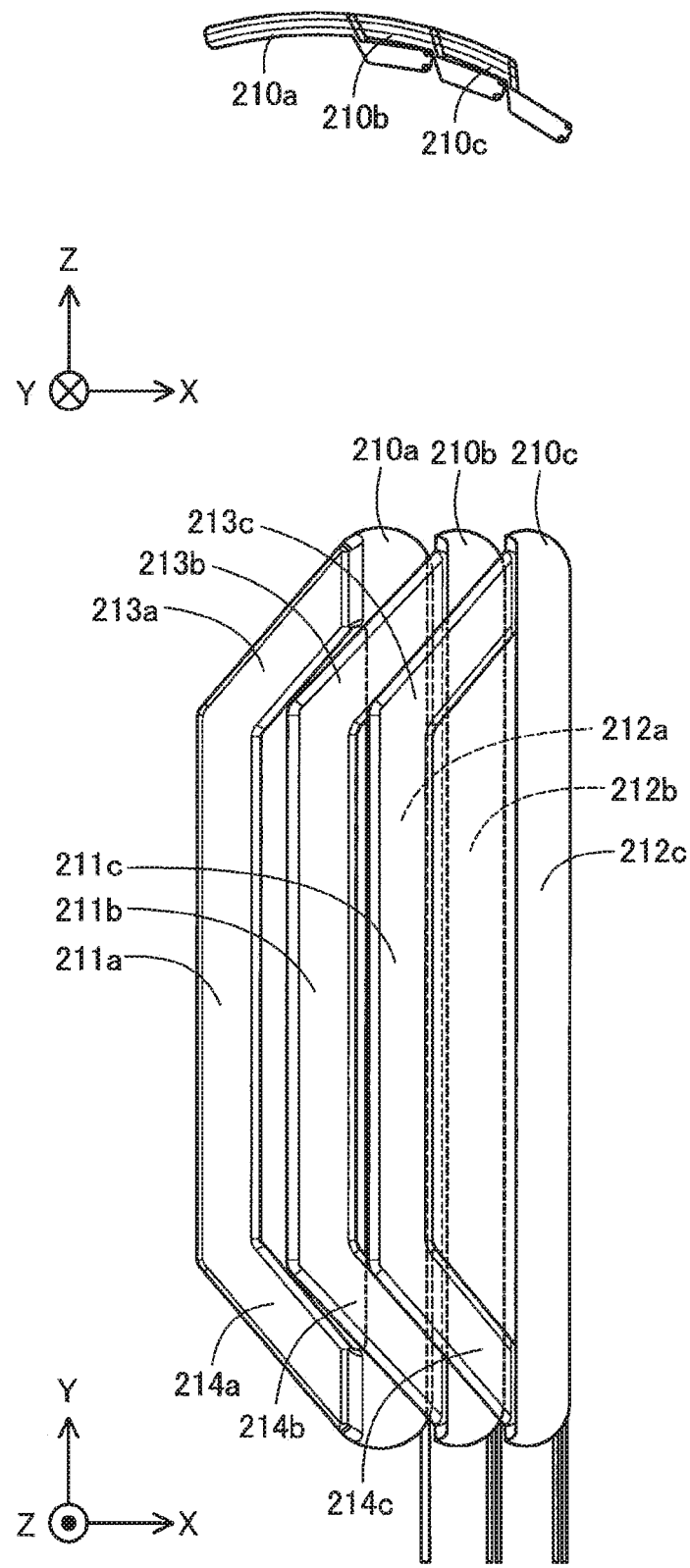
FIG. 4C is an explanatory view showing how the magnet coils are superimposed on each other.

FIGS. 4A to 4C are explanatory views showing how multiple magnet coils 210 are superimposed on each other. In each of these drawings, the upper part shows a state in which three magnet coils 210a, 210b, and 210c are viewed from the front, and the lower part shows the magnet coils 210a, 210b, and 210c in a plan view. Characters "a," "b," and "c" added after the signs 210 of magnet coils are merely for distinguishing three magnet coils 210 from each other while these magnet coils 210 have substantially the same shape. In the order of FIGS. 4A, 4B, and 4C, the distances between the magnet coils 210a, 210b, and 210c are reduced gradually, and FIG. 4C shows the same relationship in terms of their positions as those in the coil assembly 210AS shown in FIG. 3. In the plan view shown in the lower part of FIG. 4C, the magnet coils 210a, 210b, and 210c are given with reference signs such that they have the upper base parts 211a, 211b, and 211c, the lower base parts 212a, 212b, and 212c, the first leg parts 213a, 213b, and 213c, and the second leg parts 214a, 214b, and 214c, respectively.

As understood from FIG. 4C, the coil assembly 210AS has the following features (characters "a," "b," and "c" are omitted).

(1) The upper base part 211 of each one of the magnet coils 210 is housed in the air core region 218 (FIG. 2C) of a different one of the magnet coils 210 which is adjacent to the each one magnet coil 210 at the upper base part 211 side.

(2) The upper base part 211 and the two leg parts 213 and 214 of each one of the magnet coils 210 are respectively aligned in the circular direction about the center axis C of the rotor 300 (FIG. 1) with those of another different one of the magnet coils 210 which is adjacent to the each one magnet coil 210 at the lower base part 212 side, without overlapping those of the another different magnet coil 210 in the radial direction.

Figure 5:
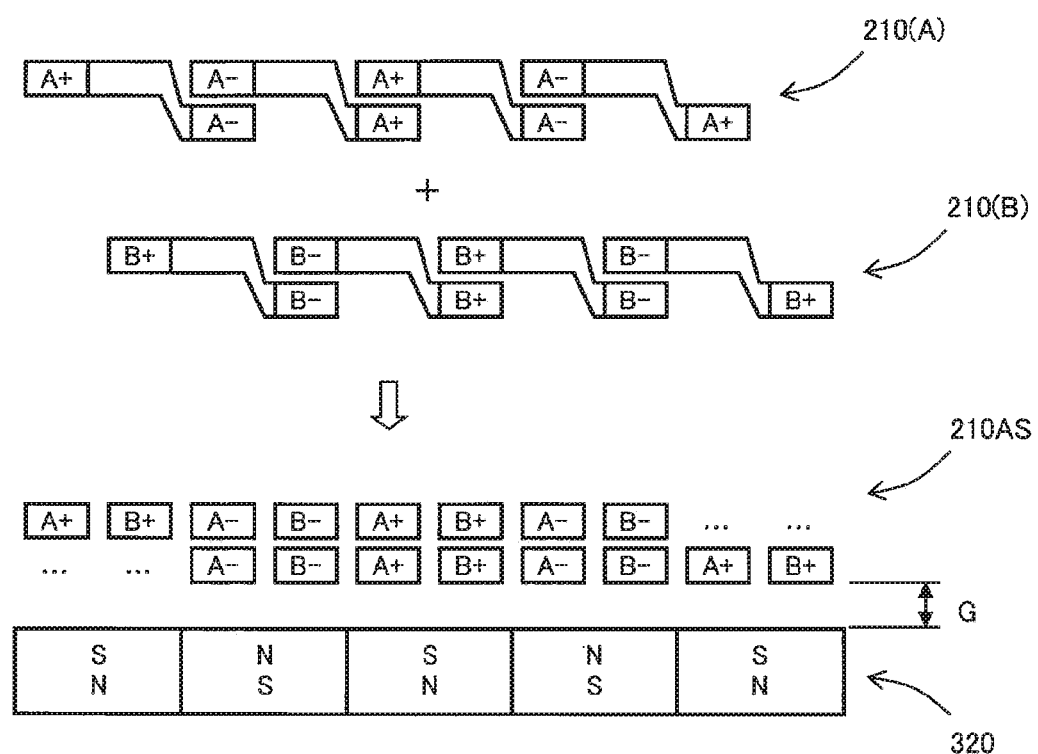
FIG. 5 is an explanatory view showing a connection state of magnet coils according to the first embodiment.

FIG. 5 is an explanatory view showing a connection state of the magnet coils 210 according to the first embodiment. The uppermost part of FIG. 5 shows a section of the A-phase magnet coil 210(A), a section of the B-phase magnet coil 210(B) is illustrated below the A-phase magnet coil 210(A). Rectangles with characters "A+," "A−," "B+," and "B−" of the magnet coils 210(A) and 210(B) show sections at the effective coil part VCP in FIG. 1 (namely, upper base part 211 or lower base part 212 in FIG. 2A), and the characters "A+," "A−," "B+," and "B−" show differences in current direction. The lower part of FIG. 5 shows the position of the coil assembly 210AS including the A phase and the B phase and those of multiple permanent magnets 320 relative to each other. For the convenience of illustration in the drawing, both the coil assembly 210AS and the permanent magnets 320 are illustrated simply along straight lines. As understood from this drawing, the A-phase magnet coil 210(A) and the B-phase magnet coil 210(B) are arranged at the same distance G from the permanent magnets 320. This makes it possible to easily realize the two-phase coreless motor 100 with little torque ripple.

Figure 6A:
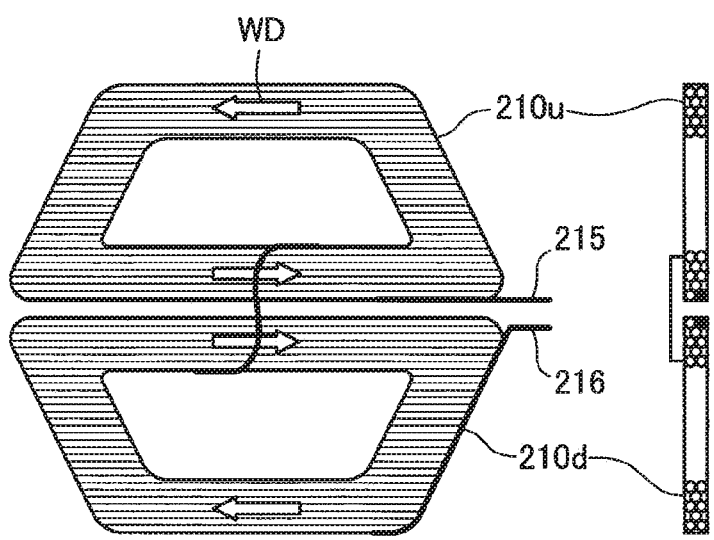
FIG. 6A is an explanatory view showing a step of forming the magnet coil.
Figure 6B:
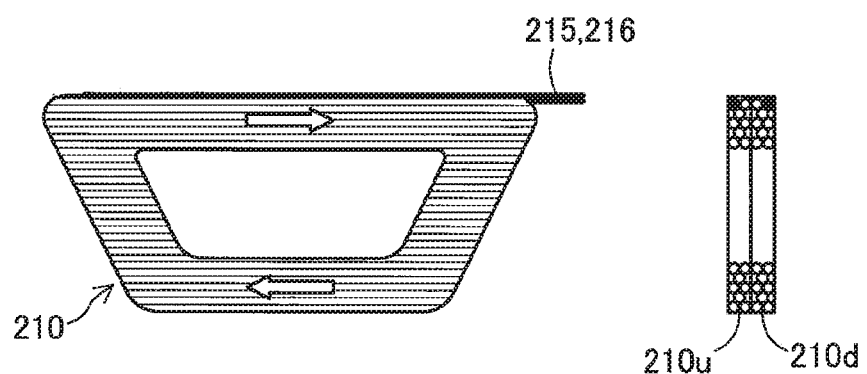
FIG. 6B is an explanatory view showing a step of forming the magnet coil.

FIGS. 6A and 6B are explanatory views showing steps of forming the magnet coil 210. First, in the step shown in FIG. 6A, a coil conductive wire is prepared, and the coil conductive wire is wound externally at both of opposite end sections from a substantially center position according to a winding to form two coil parts 210u and 210d from the single coil conductive wire. Arrows in the drawing show a winding direction WD. The left part of FIG. 6A is a plan view, and the right part of FIG. 6A is a sectional view of an effective coil part. The coil ends 215 and 216 project externally from the two coil parts 210u and 210d respectively. Next, in the step shown in FIG. 6B, the two coil parts 210u and 210d are superimposed on each other at positions facing each other to form the magnet coil 210 having a planar shape. Arrows in the drawing show a current direction determined when a current flows out from the coil end 215. Next, the planar magnet coil 210 is subjected to bending process, thereby acquiring the magnet coil 210 having the shape shown in FIGS. 2A to 2C. While the coil parts 210u and 210d are described as having an equal number of stacked wire layers, the number of stacked wire layers is not required to be equal but may be different between the coil parts 210u and 210d. For example, one coil part 210u may have a one-layer structure, and the other coil part 210d may have a four-layer structure.

Figure 7:
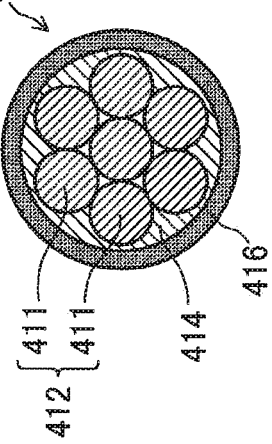
FIG. 7 is an explanatory view showing exemplary structures of coil conductive wires.

FIG. 7 is an explanatory view showing exemplary structures of coil conductive wires used for forming magnet coils. A first coil conductive wire 410 shown in the upper row of FIG. 7 includes a conductive wire bundle 412 as a bundle of multiple non-insulated conductive wires 411 each being a non-insulated wire, and an insulating coating layer 414 covering the periphery of the conductive wire bundle 412. The insulating properties of the insulating coating layer 414 are only required to withstand an induced voltage generated in one turn of the coil conductive wire 410 of the magnet coil. A second insulating covering described later functions to ensure insulating properties for withstanding potential differences occurring between coils and between phases. The non-insulated conductive wire 411 is a bare copper wire, for example. A self-welding layer 416 is formed around the insulating coating layer 414. The self-welding layer 416 is activated with heat or a solvent to fulfill the function of welding adjacent coil conductive wires 410 to each other. The self-welding layer 416 is omissible. The conductive wire bundle 412 is not braided. While the coil conductive wire 410 has a circular shape in a section, it may be formed into a substantially rectangular shape in a section.

An enamel wire commonly used as a coil conductive wire is formed of conductive wires each insulated by an insulating covering. This causes a problem that a relatively large eddy current is generated in a magnet coil when the permanent magnet 320 passes through the vicinity of the magnet coil. The eddy current may be reduced by using a Litz wire (a wire with enamel wires twisted together), for example. However, the present inventor found that using the Litz wire as the coil conductive wire causes a problem of localized excessive expansion or a break occurring during formation of the magnet coil. By contrast, the coil conductive wire 410 shown in FIG. 7 includes the conductive wire bundle 412 as a bundle of the non-insulated conductive wires 411, and the insulating coating layer 414 covering the periphery of the conductive wire bundle 412. This achieves reduction in the occurrence of localized excessive expansion or a break of the magnet coil. The experiment conducted by the present inventor shows that, even with the diameter of the non-insulated conductive wire 411 smaller than the diameter of a copper wire in a commercially-available Litz wire, the occurrence of a break of the first coil conductive wire 410 is still reduced compared to the Litz wire.

The present inventor further examined the magnitude of an eddy current generated at the first coil conductive wire 410 experimentally, and found that the diameter of the conductive wire is reducible compared to the case of using a Litz wire to allow significant reduction in the eddy current. The eddy current is generated in a direction which prohibits positional change of the permanent magnet, thereby causing resistance against rotation of a coreless motor. Hence, the eddy current is required to be reduced. The eddy current was examined by experiment conducted by moving a permanent magnet so as to pass the permanent magnet through a position in the vicinity of a surface of the coil conductive wire 410 placed in a linear pattern, and measuring force generated at the coil conductive wire 410 during the movement. In this case, the force generated at the coil conductive wire 410 is assumable to be proportionate to the magnitude of the eddy current generated at the coil conductive wire 410.

Insulating properties for withstanding potential differences occurring between coils and between phases may be ensured by further covering each of the magnet coils 210 entirely with the second insulating covering after forming each magnet coil 210 having the shape shown in FIGS. 2A to 2C using the first coil conductive wire 410. The second insulating covering is preferably made of an insulating material having more excellent withstand voltage characteristics than the insulating coating layer 414 around the conductive wire bundle 412.

An eddy current flows in an eddy pattern in a sectional direction of the non-insulated conductive wire 411 forming a coil, so that a smaller sectional area of the non-insulated conductive wire 411 is more preferable. More specifically, setting the sectional area to 0.04 mm$^2$ or less is preferable. More preferably, the sectional area may be set to 0.02 mm$^2$ or less. Meanwhile, such a configuration should be given consideration in terms of increase in electrical resistance resulting from reduction in the sectional area.

A second coil conductive wire 420 shown in the middle row of FIG. 7 also includes a conductive wire bundle 422 as a bundle of multiple non-insulated conductive wires 421 each being a non-insulated wire, and an insulating coating layer 424 covering the periphery of the conductive wire bundle 422. The non-insulated conductive wire 421 is a bare copper wire, for example. A self-welding layer 426 is formed around the insulating coating layer 424. The conductive wire bundle 412 is braided, in this example, flat braided. While the coil conductive wire 420 has a substantially rectangular shape in a section, it may be formed into a circular shape in a section. The coil conductive wire 420, which includes the braided conductive wire bundle 422, achieves improvement of the stretching properties of the coil conductive wire 420. As a result, it becomes possible to further reduce the occurrence of localized excessive expansion or a break of a magnet coil when the magnet coil is formed by winding the coil conductive wire 420. In particular, the flat braiding of the conductive wire bundle 422 makes it possible to improve stretching properties in both of two orthogonal directions (right-to-left direction and top-to-bottom direction in FIG. 7).

The magnitude of an eddy current generated at the second coil conductive wire 420 was reduced considerably, compared to the case of the first coil conductive wire 410. Possible reason for this is that braiding the conductive wire bundle 422 allows considerable reduction in the diameter of the non-insulated conductive wire 421 compared to the diameter of a copper wire in a Litz wire and fragments a path of an eddy current further, making the occurrence of an eddy current unlikely.

In this configuration in which the non-insulated conductive wires 421 are braided, setting the sectional area of each non-insulated conductive wire 421 to 0.04 mm$^2$ or less or 0.02 mm$^2$ or less does not cause a problem resulting from increased electrical resistance. Possible reason for this is that, while the electromotive force of an eddy current is small and thus the eddy current fails to flow across the non-insulated conductive wires 421 and attenuates, a coil current is supplied by application of a sufficient voltage to flow across non-insulated conductive wires.

A third coil conductive wire 430 shown in the lower row of FIG. 7 also includes a conductive wire bundle 432 as a bundle of multiple non-insulated conductive wires 431 each being a non-insulated wire, and an insulating coating layer 434 covering the periphery of the conductive wire bundle 432. The non-insulated conductive wire 431 is a bare copper wire, for example. A self-welding layer 436 is formed around the insulating coating layer 434. A plated layer 438 (for example, Sn-plated layer) is formed on a surface of each non-insulated conductive wire 431. The conductive wire bundle 432 is braided, in this example, flat braided. While the coil conductive wire 430 has a substantially rectangular shape in a section, it may be formed into a circular shape in a section. The coil conductive wire 430, which includes the conductive wire bundle 432 also braided, achieves improvement of the stretching properties of the coil conductive wire 420. As a result, it becomes possible to further reduce the occurrence of localized excessive expansion or a break of a magnet coil when the magnet coil is formed by winding the coil conductive wire 420.

The magnitude of an eddy current generated at the third coil conductive wire 430 was slightly larger than that in the case of the second coil conductive wire 420 and was substantially the same as that in the case of the first coil conductive wire 410. Thus, from the viewpoint of reducing an eddy current, using a non-plated copper wire as a non-insulated conductive wire like the second coil conductive wire 420 is preferable.

As described above, in the first embodiment, the upper base part 211 and the two leg parts 213 and 214 of each one of the magnet coils 210 are aligned in the circular direction with those of a different one of the magnet coils 210 which is adjacent to the lower base part 212 of the each one magnet coil 210, without overlapping those of the different magnet coil 210 in the radial direction. This achieves a two-phase coreless electric machine with little torque ripple.

B. Second Embodiment

Figure 8B:
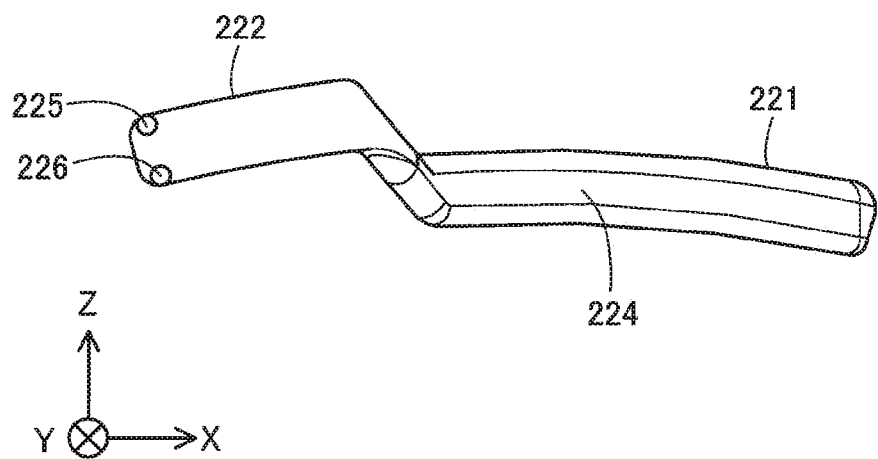
FIG. 8B is a front view of the magnet coil according to the second embodiment.
Figure 9:
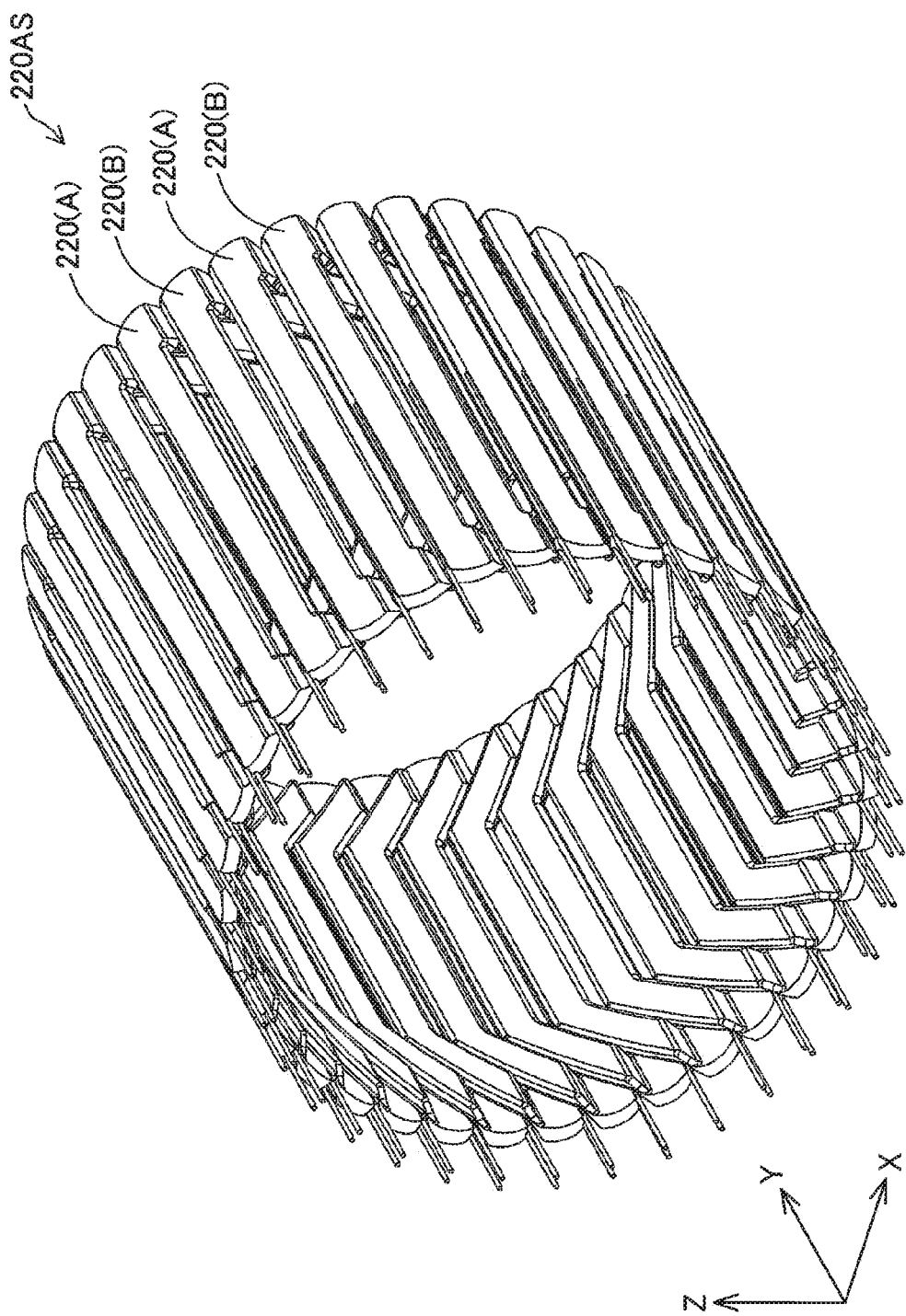
FIG. 9 is a perspective view of a coil assembly according to the second embodiment.

FIGS. 8A, 8B, and 8C show a magnet coil 220 according to a second embodiment and correspond to FIGS. 2A to 2C relating to the first embodiment respectively. FIG. 9 is a perspective view of a coil assembly 220AS with the magnet coils 220 shown in FIGS. 8A to 8C combined in a cylindrical shape or an annular shape. The sectional structure of the coreless motor shown in FIG. 1 relating to the first embodiment is also applied to the second embodiment. The configuration of the second embodiment is the same as that of the first embodiment, with only the exception that a magnet coil has a different shape.

As shown in the plan view of FIG. 8C, like the magnet coil 210 of the first embodiment, the magnet coil 220 of the second embodiment is configured as a concentrated winding coil having a trapezoidal shape with an upper base part 221 parallel to the center axis C of the rotor 300 (FIG. 1), a lower base part 222 facing the upper base part 221, and two leg parts 223 and 224 connecting the upper base part 221 and the lower base part 222. Space surrounded by the upper base part 221, the lower base part 222, and the two leg parts 223 and 224 is an air core region 228.

In the magnet coil 220 of the second embodiment, a distance between the center axis C of the rotor 300 to the upper base part 221 and a distance between the center axis C to the lower base part 222 are related to each other in the opposite way to that in the magnet coil 210 of the first embodiment. More specifically, in the magnet coil 220 of the second embodiment, the upper base part 221 is closer to the center axis C of the rotor 300 than the lower base part 222. At opposite ends of the upper base part 221, the upper base part 221 is connected to the leg parts 223 and 224 at positions on a first circumference where the upper base part 221 exists. At opposite ends of the lower base part 222, the lower base part 222 is connected to the leg parts 223 and 224 at positions on a second circumference where the lower base part 222 exists. The second circumference is arranged external to the first circumference (a position at a greater distance from the center axis of the coil assembly). Level difference portions of the leg parts 223 and 224 are connections between the first circumference and the second circumference at positions closer to the lower base part 222 than to the upper base part 221. The other features of the shape are substantially the same as those of the first embodiment, so that they will not be described here. The second embodiment also achieves effects comparable to those achieved by the first embodiment.

C. Third Embodiment

Figure 10B:
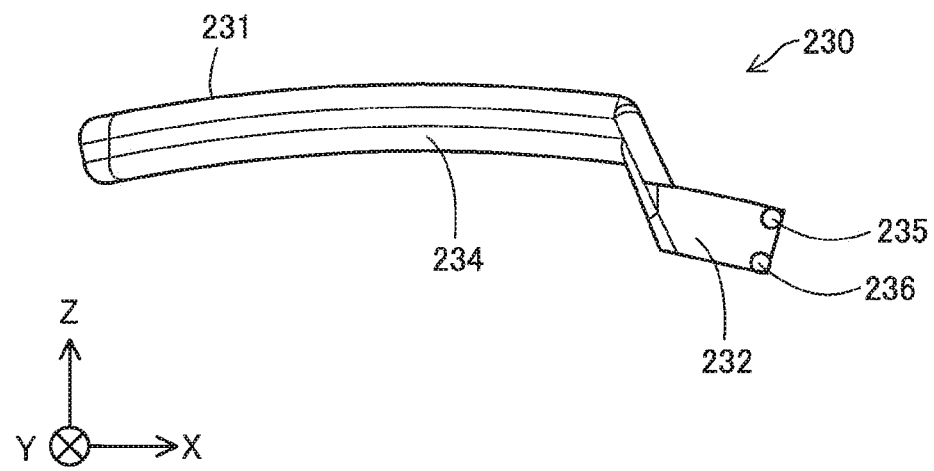
FIG. 10B is a front view of the magnet coil according to the third embodiment.

FIGS. 10A, 10B, and 10C show a magnet coil 230 according to a third embodiment and correspond to FIGS. 2A to 2C relating to the first embodiment respectively. FIG. 11 is a perspective view of a coil assembly 230AS with the magnet coils 230 shown in FIGS. 10A to 10C combined in a cylindrical shape or an annular shape. In FIG. 11, characters "(U)," "(V)," and "(W)" added after the signs 230 of magnet coils show differences between a U phase, a V phase, and a W phase. Namely, a coreless motor of the third embodiment is configured as a three-phase motor.

The sectional structure of the coreless motor 100 shown in FIG. 1 relating to the first embodiment is substantially applicable to the third embodiment. The configuration of the third embodiment is substantially the same as that of the first embodiment except for two points: a magnet coil has a different shape; and the coreless motor is configured as a three-phase motor.

As shown in the plan view of FIG. 10C, like the magnet coil 210 of the first embodiment, the magnet coil 230 of the third embodiment is configured as a concentrated winding coil having a trapezoidal shape with an upper base part 231 parallel to the center axis C of the rotor 300 (FIG. 1), a lower base part 232 facing the upper base part 231, and two leg parts 233 and 234 connecting the upper base part 231 and the lower base part 232. Each of the upper base part 231, the lower base part 232, and the two leg parts 233 and 234 has a linear shape. The upper base part 231 is shorter than the lower base part 232. The upper base part 231 and the lower base part 232 are two parallel coil parts each extending in a direction (Y direction) parallel to the center axis C of the rotor 300 and each including a portion corresponding to the effective coil part VCP in FIG. 1. Space surrounded by the upper base part 231, the lower base part 232, and the two leg parts 233 and 234 is an air core region 238. The two leg parts 233 and 234 are formed so as to set an angle θ1 between the lower base part 232 and the leg part 233 and an angle θ2 between the lower base part 232 and the leg part 234 to be less than 90 degrees. In this example, the two angles θ1 and θ2 are set to be equal degrees and the magnet coil 230 has an isosceles trapezoidal shape in a plan view. However, the two angles θ1 and θ2 may be set to be different degrees.

The upper base part 231 and the lower base part 232 are arranged on two circumferences at different distances from the center axis C of the rotor 300. More specifically, the upper base part 231 is at a greater distance from the center axis C of the rotor 300 than the lower base part 232. This relationship in terms of position is the same as that of the first embodiment. However, like in the second embodiment, the magnet coil 230 may be formed in such a manner that the upper base part 231 is closer to the center axis C of the rotor 300 than the lower base part 232. As shown in FIGS. 10A and 10B, the two leg parts 233 and 234 each have a level difference portion for connecting the upper base part 231 and the lower base part 233. The magnet coil 230 has two coil ends 235 and 236 taken out from the lower base part 232 belonging to the second coil end part CE2 (FIG. 1). At opposite ends of the upper base part 231, the upper base part 231 is connected to the leg parts 233 and 234 at positions on a first circumference where the upper base part 231 exists. At opposite ends of the lower base part 232, the lower base part 232 is connected to the leg parts 233 and 234 at positions on a second circumference where the lower base part 232 exists. The first circumference is arranged external to the second circumference (a position at a greater distance from the center axis of the coil assembly). The level difference portions of the leg parts 233 and 234 are connections between the first circumference and the second circumference at positions closer to the lower base part 232 than to the upper base part 231.

As shown in FIG. 11, a coil assembly 230AS may be formed by locating the magnet coils 230 in a ring-like pattern at regular intervals in the circular direction about the center axis C of the rotor 300, and bonding the magnet coils 230 to each other. At this time, a coil wire density may be increased by locating the magnet coils 230 in such a manner that the respective first leg parts 233 of adjacent ones of the magnet coils 230 contact each other in the circular direction and the respective second leg parts 234 of the adjacent magnet coils 230 contact each other in the circular direction. In this case, the magnet coil 230 preferably has an isosceles trapezoidal shape in a plan view. In the third embodiment, the magnet coils 230 are connected in such a manner that any three of the magnet coils 230 adjacent to each other in the circular direction belong to different phases (U phase, W phase, or W phase), unlike in the first embodiment and the second embodiment.

FIG. 12 is an explanatory view showing the magnet coils 220 in a state of being superimposed on each other in a plan view, and corresponding to the view in the lower part of FIG. 4C. Characters "a," "b," and "c" added after the signs 230 of magnet coils are merely for distinguishing three magnet coils 230 from each other and show the magnet coils 230 having substantially the same shape. The superimposed state shown in FIG. 12 is substantially the same as the superimposed state of the coil assembly 220AS shown in FIG. 11. In FIG. 12, a magnet coil 230a, a magnet coil 230b, and a magnet coil 230c are given signs 231a, 231b, and 231c respectively for their upper base parts, signs 232a, 232b, and 232c respectively for their lower base parts, 233a, 233b, and 233c respectively for their first leg parts, and 234a, 234b, and 234c respectively for their second leg parts.

As understood from FIG. 12, the coil assembly 230A of the third embodiment has the following features (characters "a," "b," and "c" are omitted).

(1) The respective upper base parts 231 of any two magnet coils 230 adjacent to each other in the circular direction are housed in the air core region 238 of a different one magnet coil 230 which is adjacent to the two magnet coils 230 at the upper base part 231 side.

(2) The upper base part 231 and the two leg parts 233 and 234 of each one of the magnet coils 230 are aligned in the circular direction about the center axis C of the rotor 300 (FIG. 1) with those of another different one of the magnet coils 230 which is adjacent to the each one magnet coil 230 at the lower base part 232 side, without overlapping those of the another different magnet coil 230 in the radial direction.

Figure 13:
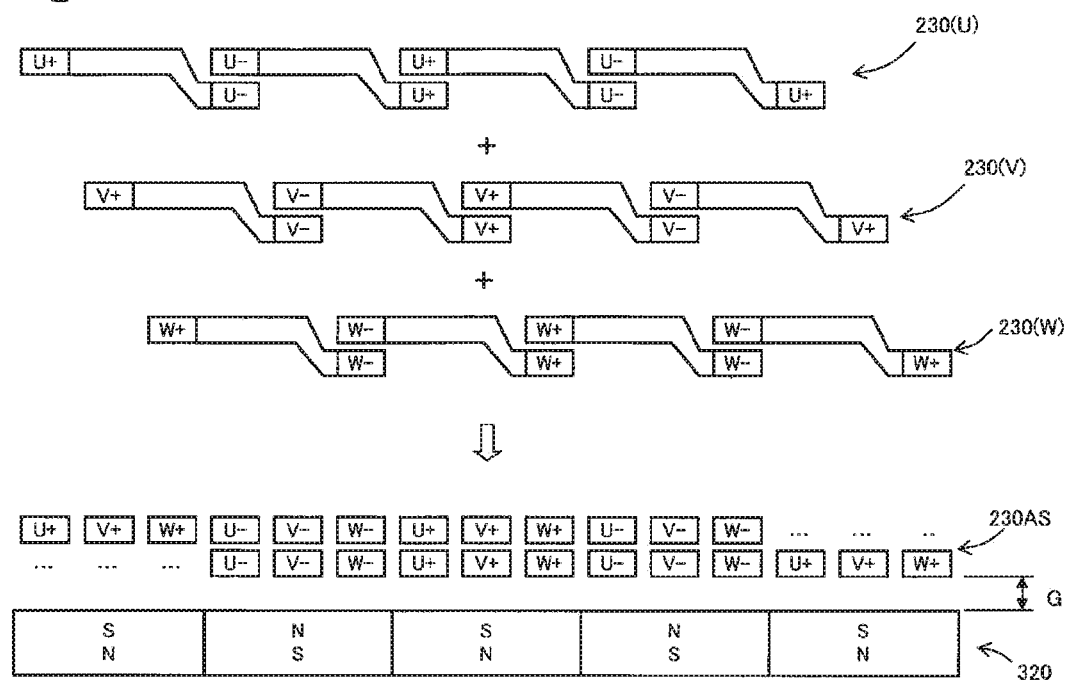
FIG. 13 is an explanatory view showing a connection state of magnet coils according to the third embodiment.

FIG. 13 is an explanatory view showing a connection state of the magnet coils 230 according to the third embodiment. The upper part of FIG. 13 shows a section of a U-phase magnet coil 230(U), a section of a V-phase magnet coil 230(V), and a section of a W-phase magnet coil 230(W). Rectangles with characters "U+," "U−," "V+," "V−," "W+," and "W−" of the magnet coils 230(U), 230(V), and 230(W) show sections at the effective coil part VCP (namely, upper base part 231 or lower base part 232), and the characters "U+," "U−," "V+," "V−," "W+," and "W−" show differences in current direction. The lower part of FIG. 13 shows the position of the coil assembly 230AS including the U phase, the V phase, and the W phase, and those of multiple permanent magnets 320 relative to each other. For the convenience of illustration in the drawing, both the coil assembly 230AS and the permanent magnets 320 are illustrated simply along straight lines. As understood from this drawing, the U-phase magnet coil 230(U), the V-phase magnet coil 230(V), and the W-phase magnet coil 230(W) are arranged at the same distance G from the permanent magnets 320. This makes it possible to easily realize a three-phase careless electric machine with little torque ripple.

The electric machine described in each of the foregoing embodiments has an inner rotor structure with a rotor arranged inside a coil assembly. Meanwhile, the present invention is further applicable to an electric machine having an outer rotor structure with a rotor arranged outside a coil assembly.

Figure 14:
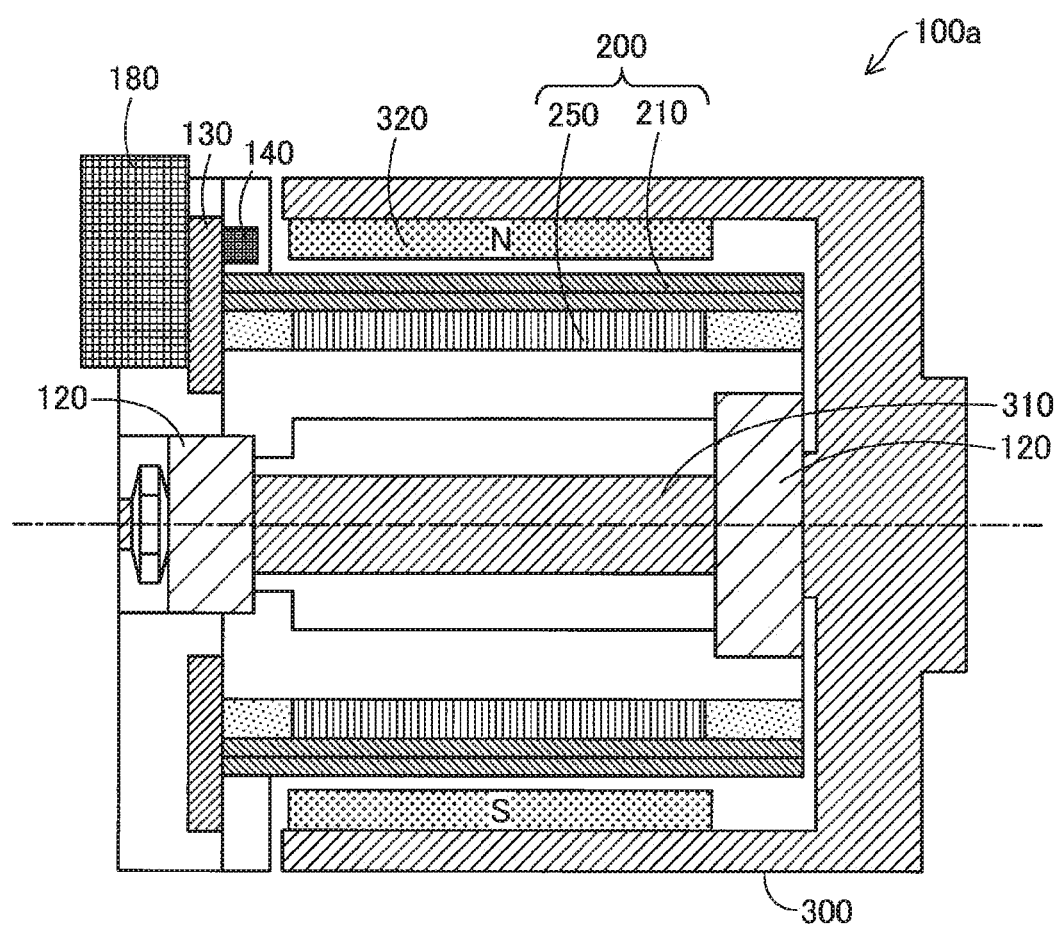
FIG. 14 is a sectional view showing a coreless motor having an outer rotor structure.

FIG. 14 is a sectional view showing a careless motor 100a as an example of an electric machine having an outer rotor structure. Parts corresponding to those of the careless motor 100 having the inner rotor structure shown in FIG. 1 are given the same signs and will not be described in detail. In the careless motor 100a shown in FIG. 14, the permanent magnet 320 of the rotor 300 is arranged external to the stator 200 with the magnet coil 210 in the radial direction in the presence of a gap between the permanent magnet 320 and the stator 200. The magnetic sensor 140 on the circuit board 130 is mounted on a position facing the permanent magnet 320. A connector 180 for connection to an external wire is connected to the circuit board 130. Like in the inner rotor structure, the stator 200 in the outer rotor structure is arranged concentrically with the rotor 300 in the presence of a gap from the rotor 300. The electric machine having this outer rotor structure achieves effects substantially comparable to those achieved by the electric machine having the inner rotor structure.

As understood from the conceptual views in FIGS. 5 and 13, the present invention is not limited to the rotary electric machine but is further applicable to a linear electric machine. This application may be realized by changing the "rotor that rotates about the center axis" described in the foregoing embodiments to a "slider that moves along a movement axis," for example. The configuration of this electric machine is such that an upper base part and a lower base part of a magnet coil are located on two planes parallel to each other, and a coil assembly includes multiple magnet coils located at regular intervals in a direction in which the slider moves.

The present invention is not limited to the above-described embodiments, examples, or modifications but is feasible in the form of various configurations within a range not deviating from the substance of the invention. For example, technical features in the embodiments, those in the examples, or those in the modifications corresponding to those in each of the aspects described in SUMMARY may be replaced or combined, where appropriate, with the intention of solving some or all of the aforementioned problems or achieving some or all of the aforementioned effects. Unless being described as absolute necessities in this description, these technical features may be deleted, where appropriate.

REFERENCE SIGNS LIST

100 . . . Coreless motor, 110 . . . Casing, 120 . . . Bearing, 130 . . . Circuit board, 140 . . . Magnetic sensor, 150 . . . Connecting substrate, 160 . . . Coil terminal, 170 . . . Resin, 200 . . . Stator, 210 . . . Magnet coil, 210AS . . . Coil assembly, 211 . . . Upper base part, 212 . . . Lower base part, 213, 214 . . . Leg part, 213$i$ . . . Inner side surface, 213$o$ . . . Outer side surface, 214$i$ . . . Inner side surface, 214$o$ . . . Outer side surface, 215, 216 . . . Coil end, 218 . . . Air core region, 220 . . . Magnet coil, 220AS . . . Coil assembly, 221 . . . Upper base part, 222 . . . Lower base part, 223, 224 . . . Leg part, 225, 226 . . . Coil end, 228 . . . Air core region, 230 . . . Magnet coil, 230AS . . . Coil assembly, 231 . . . Upper base part, 232 . . . Lower base part, 233, 234 . . . Leg part, 235, 236 . . . Coil end, 238 . . . Air core region, 250 . . . Coil back yoke, 300 . . . Rotor, 310 . . . Rotor shaft, 320 . . . Permanent magnet, 410 . . . Coil conductive wire, 411 . . . Non-insulated conductive wire, 412 . . . Conductive wire bundle, 414 . . . Insulating coating layer, 416 . . . Self-welding layer, 420 . . . Coil conductive wire, 421 . . . Non-insulated conductive wire, 422 . . . Conductive wire bundle, 424 . . . Insulating coating layer, 426 . . . Self-welding layer, 430 . . . Coil conductive wire, 431 . . . Non-insulated conductive wire, 432 . . . Conductive wire bundle, 434 . . . Insulating coating layer, 436 . . . Self-welding layer, 438 . . . Plated layer

What is claimed is:

1. A two-phase coreless electric machine comprising:
a rotor including a permanent magnet and rotating about a center axis; and
a stator including a coil assembly with a combination of multiple magnet coils and arranged concentrically with the rotor via a gap from the rotor, wherein
each of the magnet coils is configured as a concentrated winding coil comprising an upper base part parallel to the center axis, a lower base part facing the upper base part, two leg parts connecting the upper base part and the lower base part, and an air core region surrounded by the upper base part, the lower base part, and the two leg parts,
each of the magnet coils has a trapezoidal shape in a plan view,
each of the upper base part, the lower base part, and the two leg parts has a linear shape,
the two leg parts are formed so as to set an angle of less than 90 degrees between the lower base part and each of the leg parts,
the upper base part and the lower base part are arranged on two circumferences respectively at different distances from the center axis and each of the two leg parts has a level difference portion for connecting the upper base part and the lower base part, and
the coil assembly has a structure in which (i) the coil assembly is formed by arranging the magnet coils at regular intervals in a circular direction about the center axis; (ii) the magnet coils are connected in such a manner that any two of the magnet coils adjacent to each other in the circular direction belong to different phases; (iii) the upper base part of each one of the magnet coils is housed in the air core region of a different one of the magnet coils which is adjacent the each one magnet coil at a side of the upper base part side; and (iv) the upper base part and the two leg parts of the each one of the magnet coils are aligned in the circular direction with corresponding ones of the upper base part and the two leg parts of another different one of the magnet coils which is adjacent to the each one magnet coil at a side of the lower base part side, without overlapping corresponding ones of the upper base part and the two leg parts of the another different magnet coil in a radial direction of the stator.

2. The coreless electric machine according to claim 1, wherein
the two leg parts of the each one of the magnet coils contact, in the circular direction, the two leg parts of the another different one of the magnet coils which is adjacent to the each one magnet coil at the side of the lower base part.

3. The coreless electric machine according to claim 1, wherein
each of the magnet coils has two coil ends, and
the two coil ends are taken out from a coil end part of the lower base part.

4. The coreless electric machine according to claim 1, wherein
a coil conductive wire used for forming each of the magnet coils includes a conductive wire bundle as a bundle of multiple non-insulated conductive wires each being a non-insulated wire, and an insulating coating layer covering periphery of the conductive wire bundle, and
the conductive wire bundle is braided.

5. A three-phase coreless electric machine comprising:
a rotor including a permanent magnet and rotating about a center axis; and
a stator including a coil assembly with a combination of multiple magnet coils and arranged concentrically with the rotor via a gap from the rotor, wherein
each of the magnet coils is configured as a concentrated winding coil comprising an upper base part parallel to the center axis, a lower base part facing the upper base part, two leg parts connecting the upper base part and the lower base part, and an air core region surrounded by the upper base part, the lower base part, and the two leg parts, each of the magnet coils has a trapezoidal shape in a plan view, each of the upper base part, the lower base part, and the two leg parts has a linear shape, the two leg parts are formed so as to set an angle of less than 90 degrees between the lower base part and each of the leg parts, the upper base part and the lower base part are arranged on two circumferences respectively at different distances from the center axis and each of the two leg parts has a level difference portion for connecting the upper base part and the lower base part, and the coil assembly has a structure in which (i) the coil assembly is formed by arranging the magnet coils at regular intervals in a circular direction about the center axis; (ii) the magnet coils are connected in such a manner that any three of the magnet coils adjacent to each other in the circular direction belong to different phases; (iii) the respective upper base parts of any two of the magnet coils adjacent to each other in the circular direction are housed in the air core region of a different one of the magnet coils which is adjacent to the two magnet coils at a side of the upper base part; and (iv) the upper base part and the two leg parts of the each one of the magnet coils are aligned in the circular direction with corresponding ones of the upper base part and the two leg parts of another different one of the magnet coils which is adjacent to the each one magnet coil at a side of the lower base part, without overlapping corresponding ones of the upper base part and the two leg parts of the another different magnet coil in a radial direction of the stator.

6. A two-phase coreless electric machine comprising:

a slider including a permanent magnet and moving along a predetermined movement axis; and a stator including a coil assembly with multiple magnet coils combined along the movement axis, wherein each of the magnet coils is configured as a concentrated winding coil comprising an upper base part perpendicular to the movement axis, a lower base part parallel to and facing the upper base part and at the same distance from the movement axis as the upper base part, two leg parts connecting the upper base part and the lower base part, and an air core region surrounded by the upper base part, the lower base part, and the two leg parts, each of the magnet coils has a trapezoidal shape in a plan view, each of the upper base part, the lower base part, and the two leg parts has a linear shape, each of the two leg parts has a level difference portion formed at a position connected to the upper base part or the lower base part, and the coil assembly has a structure in which (i) the coil assembly is formed by arranging the magnet coils at regular intervals in a direction of the movement axis; (ii) the magnet coils are connected in such a manner that any two of the magnet coils adjacent to each other in the direction of the movement axis belong to different phases; (iii) the upper base part of each one of the magnet coils is housed in the air core region of a different one of the magnet coils which is adjacent to the each one magnet coil at a side of the upper base part; and (iv) the upper base part and the two leg parts of the each one of the magnet coils are aligned in the direction of the movement axis with corresponding ones of the upper base part and the two leg parts of another different one of the magnet coils which is adjacent to the each one magnet coil at a side of the lower base part, without overlapping corresponding ones of the upper base part and the two leg parts of the another different magnet coil in a direction perpendicular to the movement axis.

7. A three-phase coreless electric machine comprising:

a slider including a permanent magnet and moving along a predetermined movement axis; and a stator including a coil assembly with multiple magnet coils combined along the movement axis, wherein each of the magnet coils is configured as a concentrated winding coil comprising an upper base part perpendicular to the movement axis, a lower base part parallel to and facing the upper base part and at the same distance from the movement axis as the upper base part, two leg parts connecting the upper base part and the lower base part, and an air core region surrounded by the upper base part, the lower base part, and the two leg parts, each of the magnet coils has a trapezoidal shape in a plan view, each of the upper base part, the lower base part, and the two leg parts has a linear shape, each of the two leg parts has a level difference portion formed at a position connected to the upper base part or the lower base part, and the coil assembly has a structure in which (i) the coil assembly is formed by arranging the magnet coils at regular intervals in a direction of the movement axis; (ii) the magnet coils are connected in such a manner that any three of the magnet coils adjacent to each other in the direction of the movement axis belong to different phases; (iii) the respective upper base parts of any two of the magnet coils adjacent to each other in the direction of the movement axis are housed in the air core region of a different one of the magnet coils which is adjacent to the two magnet coils at a side of the upper base part; and (iv) the upper base part and the two leg parts of the each one of the magnet coils are aligned in the direction of the movement axis with corresponding ones of the upper base part and the two leg parts of another different one of the magnet coils which is adjacent to the each one magnet coil at a side of the lower base part, without overlapping corresponding ones of the upper base part and the two leg parts of the another different magnet coil in a direction perpendicular to the movement axis.

* * * * *